(12) United States Patent
Heiser et al.

(10) Patent No.: US 11,540,281 B2
(45) Date of Patent: Dec. 27, 2022

(54) CARRIER CONFIGURING AND SIGNALLING SCHEDULING IN CO-EXISTING RADIO ACCESS SYSTEMS

(71) Applicant: Telefonaktiebolaget LM Ericsson (publ), Stockholm (SE)

(72) Inventors: Franz Heiser, Järfälla (SE); Jacob Österling, Järfälla (SE); Tomas Lagerqvist, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 69 days.

(21) Appl. No.: 17/053,694

(22) PCT Filed: May 7, 2018

(86) PCT No.: PCT/SE2018/050472
§ 371 (c)(1),
(2) Date: Nov. 6, 2020

(87) PCT Pub. No.: WO2019/216796
PCT Pub. Date: Nov. 14, 2019

(65) Prior Publication Data
US 2021/0266897 A1    Aug. 26, 2021

(51) Int. Cl.
*H04W 72/04* (2009.01)
*H04W 72/12* (2009.01)

(52) U.S. Cl.
CPC ... *H04W 72/0453* (2013.01); *H04W 72/0413* (2013.01); *H04W 72/1278* (2013.01)

(58) Field of Classification Search
None
See application file for complete search history.

(56) References Cited

U.S. PATENT DOCUMENTS

2017/0188363 A1*  6/2017  Ellinikos ........... H04W 72/0453
2017/0257772 A1*  9/2017  Zhou ..................... H04L 5/001
(Continued)

FOREIGN PATENT DOCUMENTS

WO       2017173133 A1    10/2017
WO   WO-2017213561 A1 *  12/2017

OTHER PUBLICATIONS

CMCC, "R1-1708403: Discussion on UL sharing of NR and LTE," Third Generation Partnership Project (3GPP), TSG RAN WG1 Meeting #89, May 15-19, 2017, 3 pages, Hangzhou, P.R. China.
(Continued)

*Primary Examiner* — The Hy Nguyen
(74) *Attorney, Agent, or Firm* — Withrow & Terranova, PLLC

(57) ABSTRACT

A method for operating a radio access system comprises configuring a first carrier and a second carrier for use for radio access in a first radio access system. The second carrier is configured for frequency division duplex signalling. A useful frequency band of the second carrier is defined to, at least partially, overlap in frequency with a useful frequency band of a third carrier of a second radio access system. At least a part of the useful frequency band of the second carrier overlaps in frequency with guard bands of the third carrier. A method for signal scheduling comprises scheduling, in a first radio access system having a first carrier with a first carrier frequency band and a second carrier with a second carrier frequency band, uplink signals in the second carrier. Network nodes for carrying out the methods are also presented.

18 Claims, 19 Drawing Sheets

(56) References Cited

U.S. PATENT DOCUMENTS

| | | | |
|---|---|---|---|
| 2018/0035416 A1* | 2/2018 | Yi | H04W 72/0406 |
| 2018/0091264 A1* | 3/2018 | Laselva | H04L 1/1854 |
| 2019/0089498 A1* | 3/2019 | Pelletier | H04L 5/005 |
| 2019/0342130 A1* | 11/2019 | Sun | H04L 27/2666 |
| 2020/0281002 A1* | 9/2020 | Li | H04W 72/12 |

OTHER PUBLICATIONS

ZTE et al., "R1-1701618: Discussion on NR-LTE Co-existence," Third Generation Partnership Project (3GPP), TSG RAN WG1 Meeting #88, Feb. 13-17, 2017, 12 pages, Athens, Greece.
International Search Report and Written Opinion for International Patent Application No. PCT/SE2018/050472, dated Jan. 24, 2019, 11 pages.

* cited by examiner

CARRIER CONFIGURING AND SIGNALLING SCHEDULING IN CO-EXISTING RADIO ACCESS SYSTEMS

This application is a 35 U.S.C. § 371 national phase filing of International Application No. PCT/SE2018/050472, filed May 7, 2018, the disclosure of which is incorporated herein by reference in its entirety.

TECHNICAL FIELD

The proposed technology generally relates to methods and network nodes for configuring and scheduling in a radio access system.

BACKGROUND

Future generations of wireless system are expected to provide ubiquitous high data-rate coverage. Within the 3GPP collaboration, a development of a New Radio (NR) concept takes place. Within the NR concept, radio frequency bands of considerable higher frequencies are intended to be opened for use in order to increase the all-over available radio resources. Still, with the predicted increase in transmitted data in mind, the available resources have anyway to be used in an efficient way.

The use of higher frequencies also calls for new considerations to be made. The radio beams of higher frequencies allows in general a more elaborate beamforming, but on the other hand the radio signals are in general suffering from more propagation losses. This typically limits the coverage area of a radio base station compared to the coverage of more conventional frequency bands.

NR will typically be introduced in mid bands using Time Division Duplex (TDD). Mid bands are typically referred to as frequencies between 2 and 6 GHz. This implementation has three main disadvantages.

Mid band has typically uplink (UL) coverage problems. The available coverage area for UL signalling is generally smaller than for downlink (DL) signalling. This means that e.g. UL control channel coverage does not correspond to the coverage area where DL signal can be received. TDD makes this even worse since the UL time typically is restricted compared to DL.

Furthermore, TDD reduce the ability to present ultra-low latency. One aspect is that the reverse link Transmission Control Protocol (TCP) Acknowledgement/Non-acknowledgement (ACK/NACK) and the Hybrid Automatic Repeat-reQuest (HARQ) ACK/NACK have to wait for the right time in the TDD structure, which may delay the process outside the requested latency requirements.

Another obstacle for achieving ultra-low latency signalling is that new transmissions also have to wait for the right time in the TDD structure.

There are in prior art two known solutions to address the above problems. One possibility is to use Supplementary UL & Carrier aggregation. The mid band is thereby complemented with NR transmissions on a low band, preferably in Frequency Division Duplex (FDD) mode. Low band is typically referred to as frequencies below 2 GHz. This requires a NR carrier in the low band, which by standard requires at least 5 MHz. This solution thus requires fairly large radio resources. To get the HARQ in low band in a Carrier Aggregation configuration, the Primary Cell (PCell) has to be allocated to the low band. For Supplementary UL, the PCell can be allocated to the Mid band.

Another solution can be spectrum sharing on low band between Long-Term Evolution (LTE) and NR. NR and LTE can by this share the same spectrum, by coordinating the scheduling. LTE reference symbols are thereby transmitted and the NR traffic uses puncturing schemes to fit in-between. To get the low latency link desired, coordination between the scheduling of NR and LTE is needed in Transmission Time Interval (TTI) level. This fast coordination put severe requirements on both participating radio access systems.

SUMMARY

It is thus an object to maintain the benefits of the known solutions, but without needing fast coordination of scheduling and without occupying large additional frequency bands.

This and other objects are met by embodiments of the proposed technology.

According to a first aspect, there is provided a method for operating a radio access system, comprising the step of configuring a first carrier having a first carrier frequency band and a second carrier having a second carrier frequency band for use for radio access in a first radio access system. The second carrier is configured for frequency division duplex signalling. A useful frequency band of the second carrier is defined to, at least partially, overlap in frequency with a useful frequency band of a third carrier having a third carrier frequency band of a second radio access system. The third carrier has an overlapping coverage area with the second carrier. At least a part of the useful frequency band of the second carrier overlaps in frequency with guard bands of the third carrier.

According to a second aspect, there is provided a method for signal scheduling, comprising the step of scheduling, in a first radio access system having a first carrier with a first carrier frequency band and a second carrier with a second carrier frequency band, uplink signals in the second carrier. The second carrier is configured for frequency division duplex signalling. A useful frequency band of the second carrier is defined to, at least partially, overlap in frequency with a useful frequency band of a third carrier having a third carrier frequency band of a second radio access system. The third carrier has an overlapping coverage area with the second carrier. The uplink signals scheduled to the second carrier are scheduled to physical resource blocks of frequencies of the useful frequency band of the second carrier overlapping in frequency with guard bands of the third carrier.

According to a third aspect, there is provided a network node configured to operate in a radio access system. The network node is configured to configure a first carrier having a first carrier frequency band and a second carrier having a second carrier frequency band for use for radio access in a first radio access system. The second carrier is configured for frequency division duplex signalling. A useful frequency band of the second carrier is defined to, at least partially, overlap in frequency with a useful frequency band of a third carrier having a third carrier frequency band of a second radio access system. The third carrier has an overlapping coverage area with the second carrier. At least a part of the useful frequency band of the second carrier overlaps in frequency with guard bands of the third carrier.

According to a fourth aspect, there is provided a network node configured to perform signal scheduling. The network node is configured to schedule, for a first radio access system having a first carrier with a first carrier frequency band and a second carrier with a second carrier frequency band, uplink signals in the second carrier. The second carrier is configured for frequency division duplex signalling. A useful frequency band of the second carrier is defined to, at least partially, overlap in frequency with a useful frequency band of a third carrier having third carrier frequency band of a second radio access system. The third carrier has an overlapping coverage area with the second carrier. The uplink signals scheduled to the second carrier are scheduled to physical resource blocks of frequencies of the useful frequency band of the second carrier overlapping in frequency with guard bands of the third carrier.

According to a fifth aspect, there is provided a computer program comprising instructions, which when executed by at least one processor, cause the at least one processor to configure a first carrier having a first carrier frequency band and a second carrier having a second carrier frequency band for use for radio access in a first radio access system. The second carrier is configured for frequency division duplex signalling. A useful frequency band of the second carrier is defined to, at least partially, overlap in frequency with a useful frequency band of a third carrier having a third carrier frequency band of a second radio access system. The third carrier has an overlapping coverage area with the second carrier. At least a part of the useful frequency band of the second carrier overlaps in frequency with guard bands of the third carrier.

According to a sixth aspect, there is provided a computer program comprising instructions, which when executed by at least one processor, cause the at least one processor to schedule, for a first radio access system having a first carrier with a first carrier frequency band and a second carrier with a second carrier frequency band, uplink signals in the second carrier. The second carrier is configured for frequency division duplex signalling. A useful frequency band of the second carrier is defined to, at least partially, overlap in frequency with a useful frequency band of a third carrier having a third carrier frequency band of a second radio access system. The third carrier has an overlapping coverage area with the second carrier. The uplink signals scheduled to the second carrier are scheduled to physical resource blocks of frequencies of the useful frequency band of the second carrier overlapping in frequency with guard bands of the third carrier.

According to a seventh aspect, there is provided a computer-program product comprising a computer-readable medium having stored thereon a computer program according to the fifth or sixth aspect.

According to an eighth aspect, there is provided a network node for operating in a radio access system. The network node comprises a configuration module, configured for configure a first carrier having a first carrier frequency band and a second carrier having a second carrier frequency band for use for radio access in a first radio access system. The second carrier is configured for frequency division duplex signalling. A useful frequency band of the second carrier is defined to, at least partially, overlap in frequency with a useful frequency band of a third carrier having a third carrier frequency band of a second radio access system. The third carrier has an overlapping coverage area with the second carrier. At least a part of the useful frequency band of the second carrier overlaps in frequency with guard bands of the third carrier.

According to a ninth aspect, there is provided a network node for performing signal scheduling. The network node comprises a scheduler, configured for scheduling, for a first radio access system having a first carrier with a first carrier frequency band and a second carrier with a second carrier frequency band, uplink signals in the second carrier. The second carrier is configured for frequency division duplex signalling. A useful frequency band of the second carrier is defined to, at least partially, overlap in frequency with a useful frequency band of a third carrier having a third carrier frequency band of a second radio access system. The third carrier has an overlapping coverage area with the second carrier. The uplink signals scheduled to the second carrier are scheduled to physical resource blocks of frequencies of the useful frequency band of the second carrier overlapping in frequency with guard bands of the third carrier.

An advantage of the proposed technology is that it increases the available coverage and enables reduced latency. The released requirement of coordination of scheduling will simplify the realization, decouple SoftWare (SW) releases, and allow the low bands to be used also when other vendors have delivered the original solution of the second radio access system, e.g. LTE.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

For a better understanding of the proposed technology, it may be useful to begin with a brief overview of systems using NR solutions.

Figure 1:
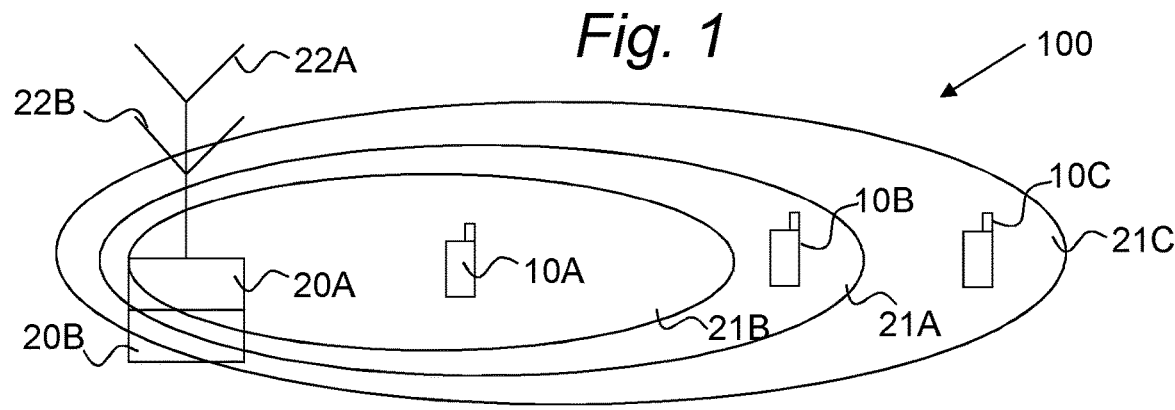
FIG. 1 illustrates an example of a communication system.

FIG. 1 illustrates a communication system 100 operating according to the NR ideas, having an antenna 22A connected to a base station 20A. The communication is typically based on TDD in the midband. The base station 20A communicates with user equipments (UE) 10A and 10B. For DL signalling, the coverage area 21A associated with the antenna 22A covers both UEs 10A and 10B. However, in the UL direction, only UE 10A is capable of communicating with the base station 20A, and an associated UL coverage area is illustrated as 21B.

Co-located with the NR system, an "old" LTE-based system may be provided. A base station 20B of a LTE type is connected to a radio unit having an antenna 22B. The communication is typically based on FDD in the lowband. This antenna 22B is associated with a coverage area 21C, which typically is larger than both the coverage area 21A and 21B, and enables communication with also a UE 10C.

The LTE could run 900 MHz and the NR 3.5 GHz, or LTE 2.6 GHz and NR 3.5 GHz, or even 28 GHz.

Figure 2:
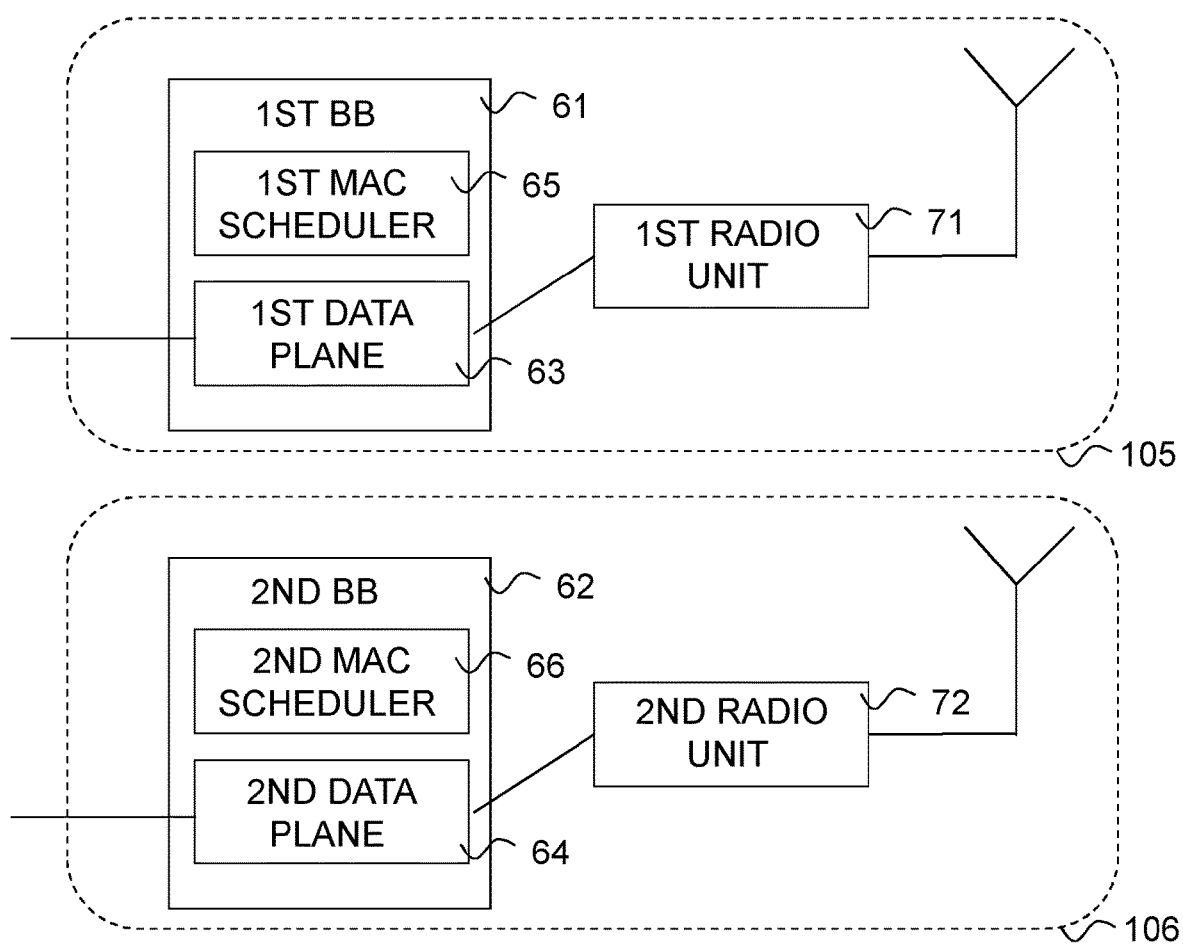
FIG. 2 illustrates co-existing radio access systems.

FIG. 2 illustrates a similar situation in a more conceptual view. Two separate systems, a first radio access system 105, in this particular example an NR system, and a second radio access system 106, in this particular example an LTE system. The first radio access system 105 comprises in a first BaseBand (BB) entity 61 with a first data plane 63 and a first control plane, here denoted as a first Medium Access Control (MAC) scheduler 65. The MAC scheduler 65 determines every TTI which users should transmit/receive and in what part of the frequency band. The BB 61 is connected to a first radio unit 71 adapted for operation in the midband frequencies. The second radio access system 106 comprises in a second BaseBand (BB) entity 62 with a second data plane 64 and a second control plane, here denoted as a second MAC scheduler 66. The BB 62 is connected to a second radio unit 72 adapted for operation in the lowband frequencies. In such a configuration, the two systems operate entirely independently of each other.

In other words, this involves two separate BB entities, one for NR and one for LTE. It also involves two radios, one for Midband and one for Lowband. Typically, the LTE system is "old", and the NR is added later, both with its BB entity and its Midband radio.

As briefly mentioned in the background, the NR system using TDD in midband frequencies may present some disadvantages. One disadvantage is easily seen in FIG. 1, where communication with UE 10C is not possible at all and communication with UE 10B is not possible in the UL.

Figure 3:
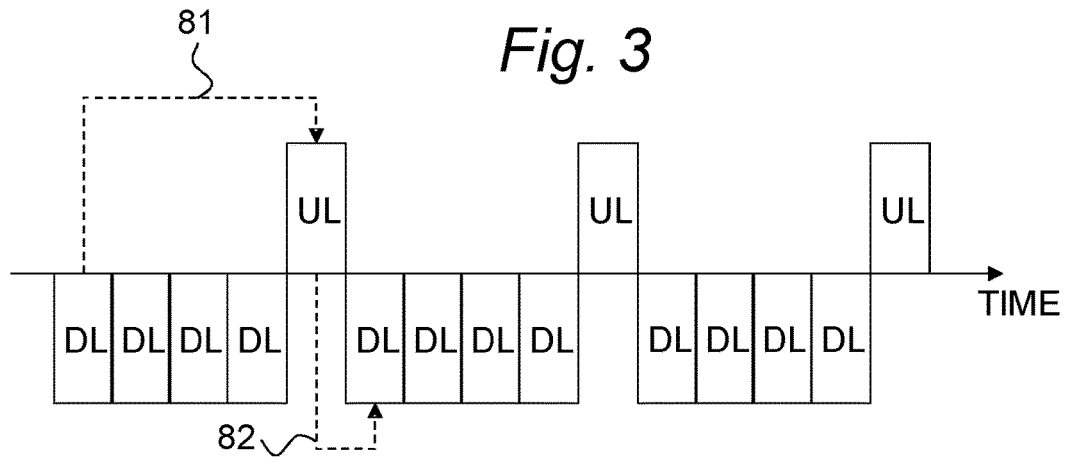
FIG. 3 illustrates an example of a HARQ retransmission of an existing TDD scheme solution.

The use of TDD in the mid band radio, i.e. alternating between DL and UL, has two disadvantages, illustrated in FIG. 3. The UL transmission is running less portion of the time, which gives less time left to transmit data from the UL. Each TTI is illustrated as a rectangle. This condition thus results in a worse link budget for UL messages. A transmission may have to wait for the TDD pattern to allow it to be transmitted. For instance, if a UE wants to transmit a DL HARQ NACK related to a certain DL transmission, it will have to wait until there is a UL TTI available. In FIG. 3, if the DL transmission under consideration was received in the first DL TTI, there is no UL TTI until four TTIs later, as illustrated by an arrow 81. The retransmission DL will then additionally, as indicated by arrow 82, have to wait until there is a DL TTI available. In the example of FIG. 3, assuming a TTI duration of 0.5 ms, the TDD pattern of 2 ms DL plus 0.5 ms UL becomes devastating when chasing a total latency of a few ms.

Also when a new transmission is to be initiated, the data to be transmitted has to wait for suitable UL or DL TTIs to appear.

Figure 4:
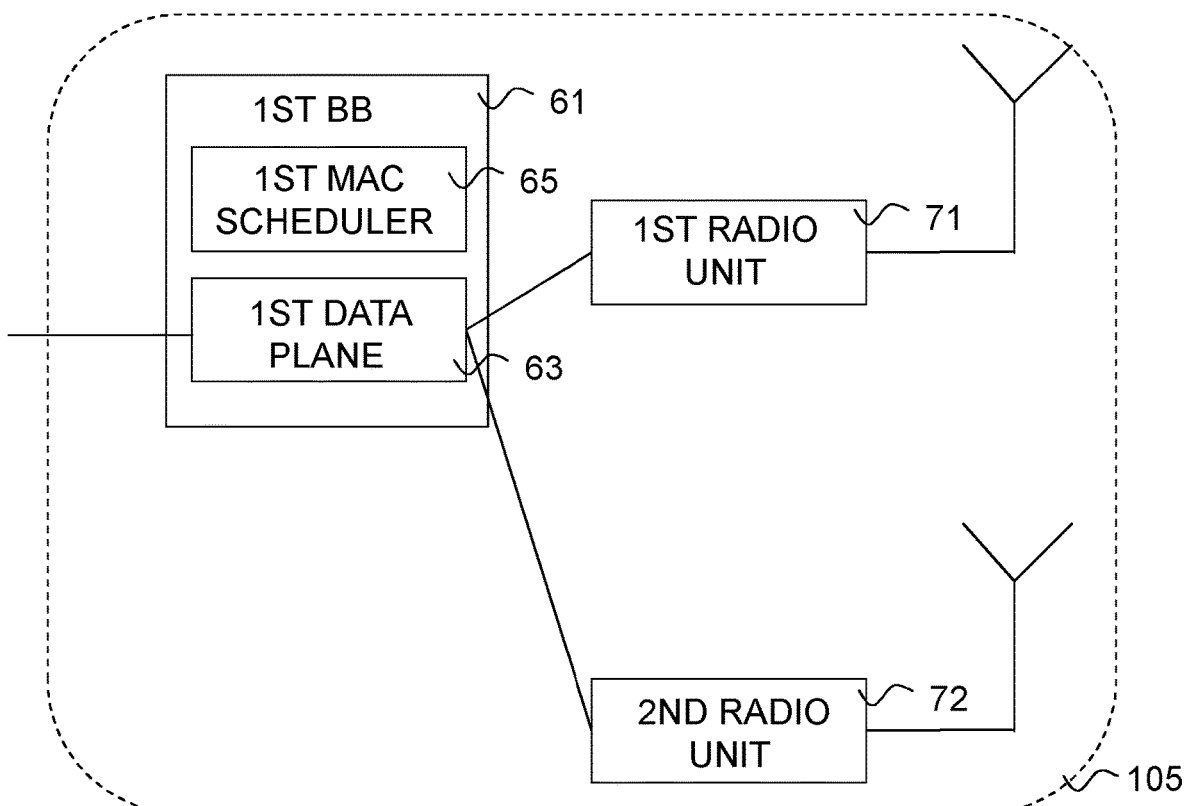
FIG. 4 illustrates an example of a two-carrier radio access system.
Figure 5:
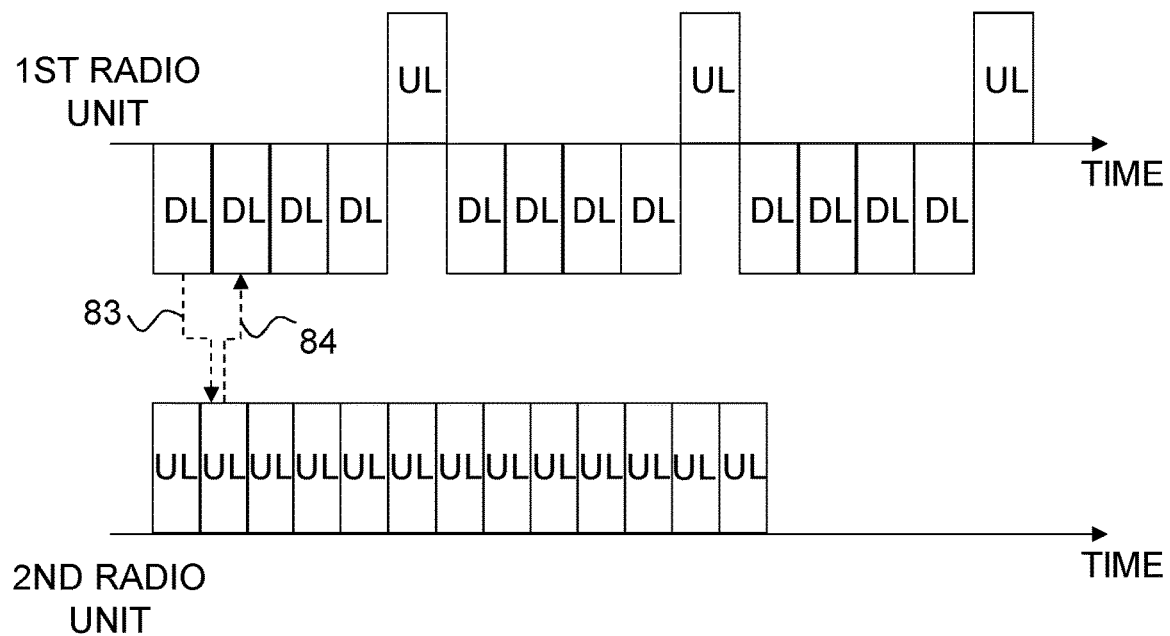
FIG. 5 illustrates an example of a HARQ retransmission in a radio access system having access to a TDD mid band and a FDD low band.

FIG. 4 illustrates an example of a first radio access system 105, e.g. a NR system, solving these problems. The first radio access system 105 has access to an additional second radio unit 72 adapted for operation in the lowband frequencies. Utilizing the Supplementary UL and Carrier aggregation approach presented e.g. in the NR, some signalling can be moved by the MAC scheduler 65 from the midband to the lowband. This lowband communication can be configured for FDD, which solves some of the above mentioned problems with unavailability of TTIs allowing UL transmissions, as shown in FIG. 5. If a DL transmission in the midband fails and a MAC NACK is to be sent, an UL TTI is always available in the lowband within very short times, as illustrated by arrow 83. A retransmission can then be performed within just one or a couple of midband TTIs, as illustrated by arrow 84.

The disadvantage of the solution of FIG. 4 is that it requires an additional carrier. If e.g. a LTE system still is running in the same location area, available carriers in the lowband frequency region are most probable rare. In areas with co-existing LTE and NR systems, another approach has typically to be adopted.

Figure 6:
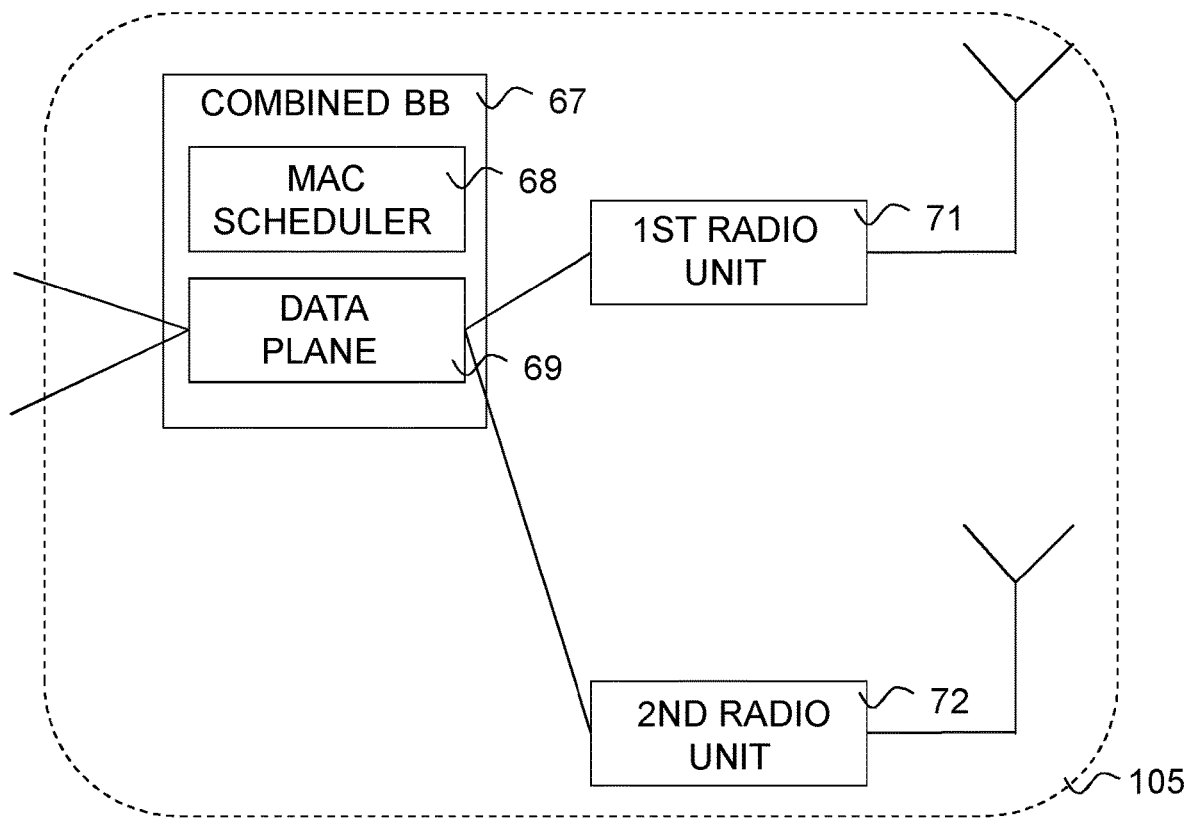
FIG. 6 illustrates an example of a system having a combined baseband unit for two radio access methods.

Coordinating carriers between LTE and NR for spectrum sharing on low band may provide one such option. FIG. 6 illustrates schematically such a scheme. A common or cooperating BB 67 has a MAC scheduler 68 and a data plane 69 that can enable a sharing of the same spectrum, by coordinating the scheduling. LTE reference symbols are thereby transmitted and the NR traffic uses puncturing schemes to fit in-between. However, as mentioned in the background, to get the low latency link desired, coordination between the scheduling of NR and LTE is needed in TTI level. Furthermore, the design of the LTE and NR parts have to be intimately coordinated, which may cause problems if the systems are provided by different vendors.

By the insight that e.g. NR has smaller guard band than LTE, another solution is hereby presented. A 20 MHz NR carrier has more utilizable spectrum than a 20 MHz LTE carrier. By adding a low band NR, e.g. for low latency and coverage challenged channels, as an overlay to an LTE network, latency and coverage advantages will be present without any need for coordination, synchronization, etc. between the two networks. In other words, in some embodiments, the LTE network may be totally unaware of the existence of the NR network. In other embodiments, configuration-type of agreements may be exchanged between the networks, but there is no need for any coordination in the time range of a few TTIs.

The examples and embodiments in the present disclosure are using NR and LTE as example radio access technologies. However, any radio access systems could in principle be used as long as they exhibit the conditions defined in the claims.

Figure 7:
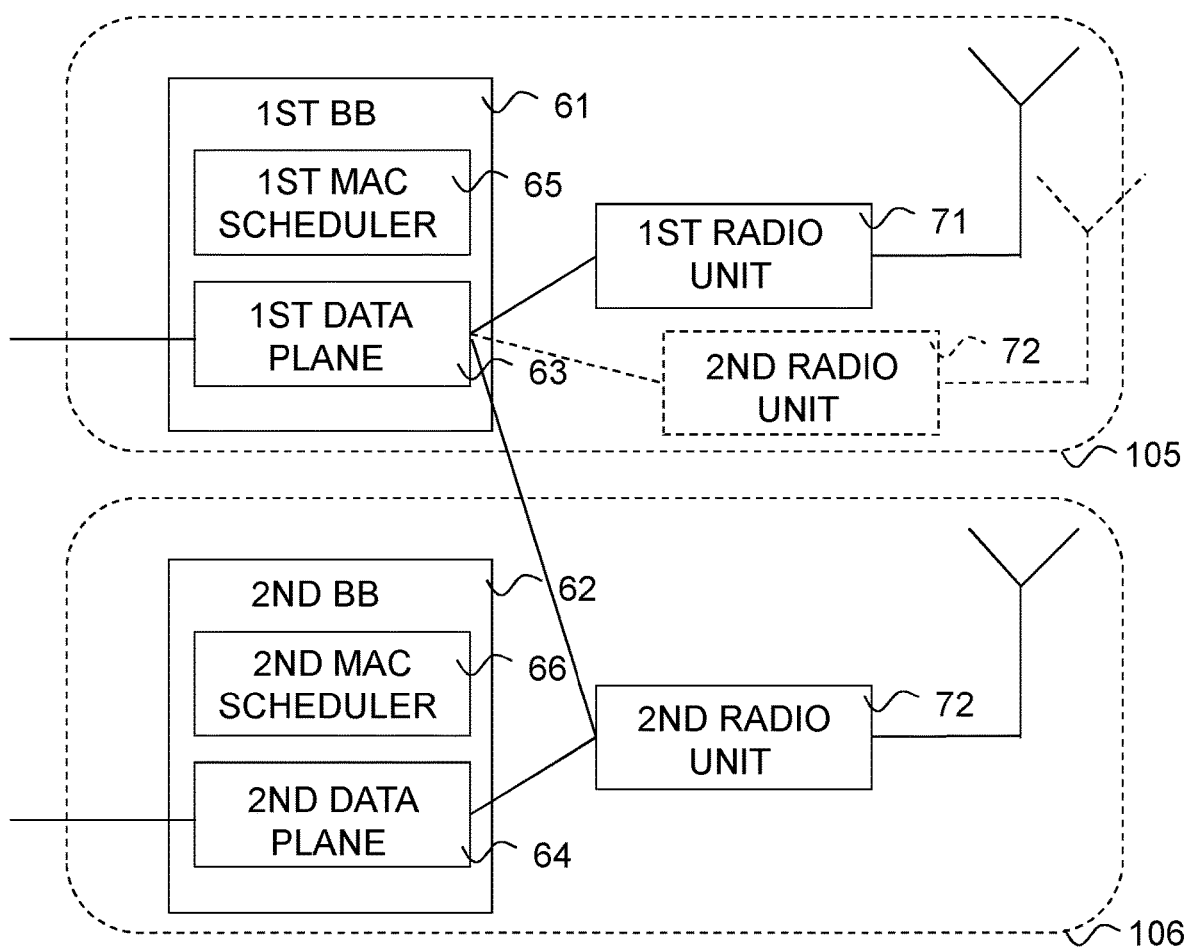
FIG. 7 illustrates an embodiment of two co-existing radio access systems using overlapping carriers.

An embodiment of a communication system 100 is illustrated in FIG. 7. Here, two separate BB entities 61, 62, one for a first radio access system, e.g. NR, and one for a second radio access system, e.g. LTE. It also indicates two radio units 71, 72, one for Midband frequencies and one for Lowband frequencies.

Each BB entity 61, 62 contains a data plane 63, 64 and a control plane 65, 66. The control plane 65, 66, denoted as a MAC scheduler determines every TTI which users should transmit/receive and in what part of the useful frequency band of the available carrier(s). The BB entity 61 for the first radio access system is connected to both radio units 71, 72, while the BB entity 62 for the second radio access system is connected to radio unit 72 only.

In an alternative embodiment, there may be provided separate lowband radio units 72 for the first and second radio access system, respectively, as indicated by the parts drawn with dotted lines.

The spectrum of the mid band radio unit is running only for transmissions in the first radio access system. The benefits from the present ideas are most prominent if the first radio access system radio unit operates at higher carrier frequencies than the second radio access system radio unit. However the opposite may also be utilized.

Figure 8A:
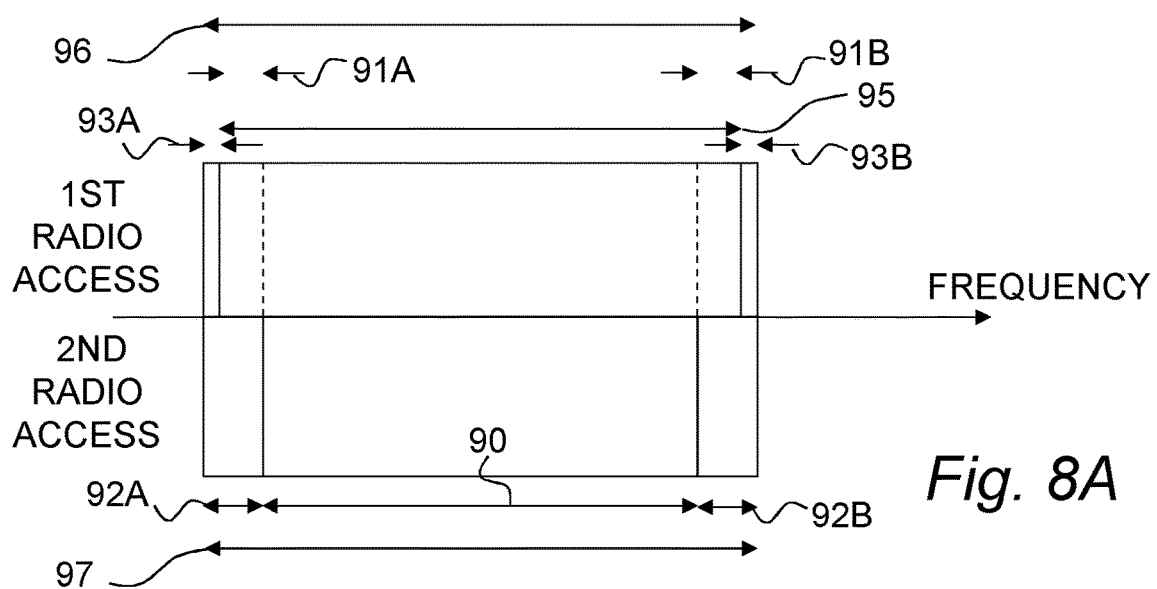
FIG. 8A illustrates an embodiment of a frequency spectra of two overlapping carriers.

The spectrum of the low band radio, i.e. the second carrier, is shown in more detail in FIG. 8A. (A first carrier having a first carrier frequency band is configured in the first radio access system at another frequency range than what is shown in FIG. 8A. Preferably this first carrier frequency band is situated at higher frequencies.) The second carrier, as illustrated in FIG. 8A is configured for FDD signalling. A useful frequency band 95 of the carrier for use in the first radio access system is defined. Also, a useful frequency band 90 of the third carrier for use in the second radio access system is defined. The useful frequency band 95 of the second carrier of the first radio access system is defined to, at least partially, overlap in frequency with the useful carrier band 90 of the third carrier of the second radio access system.

The third carrier of the second radio access system is used co-located to the second carrier of the first radio access system. In other words, the third carrier has an overlapping coverage area with the second carrier.

The spectrum is primarily used for transmissions in the second radio access system in a carrier 97 of the second radio access system. However, as indicated, outer parts 91A and 91B of the spectrum are running transmissions in the first radio access system instead. The parts 91A and 91B, at least partially, overlap in frequency with guard bands 92A and 92B associated with the carrier frequency band 97 of the second radio access system. In other words, scheduling of transmission for the first radio access system can take place in the guard band of the second radio access system, on one side or on both sides. The first radio access system typically also has guard bands, illustrated as 93A and 93B. The guard bands 93A and 93B together with the useful frequency band 95 constitute a total frequency band 96 of the second carrier for the first radio access system. In this example this second carrier frequency band 96 is also equal to the third carrier frequency band 97 of the guard bands 92A and 92B together with the useful frequency band 90 of the third carrier of the second radio access system.

Note that the useful frequency range 95 of the first radio access system is defined across the whole useful frequency range 90 of the second radio access system, but only the outer Physical Resource Blocks (PRB) are used.

The amount of frequency that is possible to use in the low band depends on the size differences of the guard bands. In the embodiments where NR and LTE are combined, the amount of frequency that is useful in the low band is decided by the channel occupancy specified by 3GPP. For 10 MHz, NR has 0.36 MHz more than LTE. For 20 MHz, NR has 1.1 MHz more than LTE. The extra available bandwidth is due to the larger guard bands in LTE.

Figure 8B:
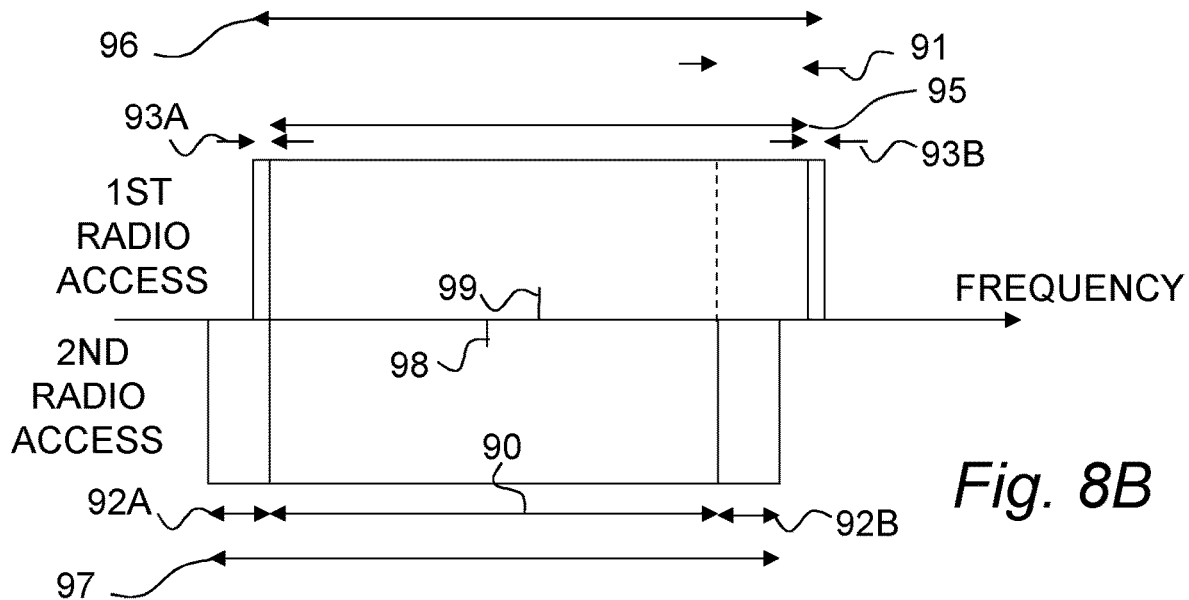
FIG. 8B illustrates another embodiment of a frequency spectra of two overlapping carriers.

If it is desirable to have more contiguous spectrum for the first radio access system, the first radio access system spectrum can be moved relative to the second radio access system spectrum. This is shown in FIG. 8B. In this embodiment, the centre frequency 99 of the useful frequency band 95 is offset with respect to a centre frequency 98 of the useful frequency band 90. In the present embodiment, the offset is equal to the width of one of the guard bands 92A and 92B. The outer part 91 of the useful frequency band 95, on which transmissions in the first radio access system are running is thus just one band, however, with an increased bandwidth.

In other words, a centre frequency of the useful frequency band of the carrier of the first radio access system is offset with respect to a centre frequency of the useful frequency band of the carrier of the second radio access system. However, they are still partially overlapping.

Preferably, the offset is equal to a width of the guard bands associated with the carrier of the second radio access system.

The offset may of course also be selected to be negative, i.e. the outer part 91 of the useful frequency band 95, on which transmissions in the first radio access system are running becomes situated at the low frequency end of the useful frequency band 95.

In alternative embodiments, the offset between the centre frequencies 98 and 99 can be selected differently. If the absolute value of the offset is less than the guard bands of the second radio access system, but different from zero, there will be two outer parts 91A and 91B to utilize, however, with differing bandwidth.

The use of outer parts of a useful frequency band of a carrier of the first radio access system overlapping with guard bands of a carrier of the second radio access system gives a number of advantages. A fast available radio resource, although relatively limited, is provided. This enables to take care of needs for e.g. latency sensitive transmissions, in an analogue manner as was illustrated in FIG. 5. At the same time, the complex situation of common scheduling as illustrated in FIG. 6 is avoided.

Figure 9:
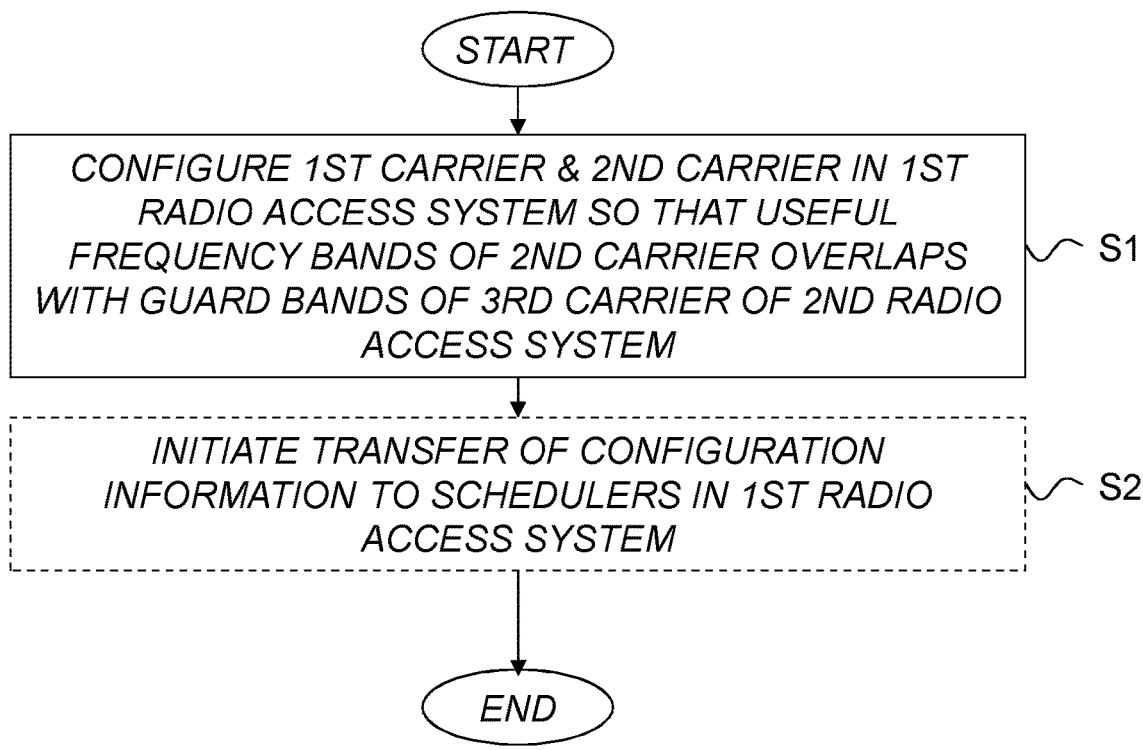
FIG. 9 is a schematic flow diagram illustrating steps of an embodiment of a method for operating a radio access system.

FIG. 9 is a schematic flow diagram illustrating steps of an embodiment of a method for configuring carriers for radio access. In step S1, a first carrier and a second carrier are defined for use in a first radio access system, each having a respective carrier frequency band. A useful frequency band of the second carrier is defined such that it overlaps with guard bands of a third carrier of a second radio access system.

In a particular embodiment, the method comprises the further step S2, in which a transfer of configuration information to schedulers in the first radio access system is initiated.

In a particular embodiment, the first radio access system is a NR system and the second radio access system is an LTE system.

In other words, a first carrier having a first carrier frequency band and a second carrier having a second carrier frequency band are configured for use for radio access in a first radio access system. The second carrier is configured for FDD signalling. A useful frequency band of the second carrier is defined to, at least partially, overlap in frequency with a useful frequency band of a third carrier having a third carrier frequency band of a second radio access system. The third carrier has an overlapping coverage area with the second carrier. The useful frequency band of the second carrier overlaps in frequency with guard bands of the third carrier.

The invention adds a low throughput channel in the low band by utilizing the extra frequency intervals made available by e.g. the lower guard bands on NR compared to LTE.

Preferably, the useful frequency band of the second carrier is wider than the useful frequency band of the third carrier.

Preferably, the first radio access system is configured for restricting signal scheduling to physical resource blocks of limited parts of the second carrier frequency band.

Preferably, the first carrier frequency band is situated at higher frequencies than the second carrier frequency band.

The configuration of the carriers for radio access enables a further use of the so created available resource blocks. In other words, the method of FIG. 9 can be interpreted as a manufacturing method or enabling method, while the scheduling methods presented here below are methods utilizing the so created system.

The configuration of the low throughput channel is utilized primarily to schedule high priority small size transmissions, and coverage challenged transmissions. The first radio access system MAC scheduler is made aware of this channel and uses it in a best possible way.

The new available resources are relatively limited, and in order to achieve maximum benefit, the signalling of these resources should be restricted and carefully selected. The traffic put on the available part of the low band could primarily be selected as HARQ ACK/NACK signalling, Transmission Control Protocol (TCP) ACK/NACK signalling, Quick User Datagram Protocol (UDP) Internet Connections (QUIC) ACK/NACK signalling, or low latency short messages.

Figure 10:
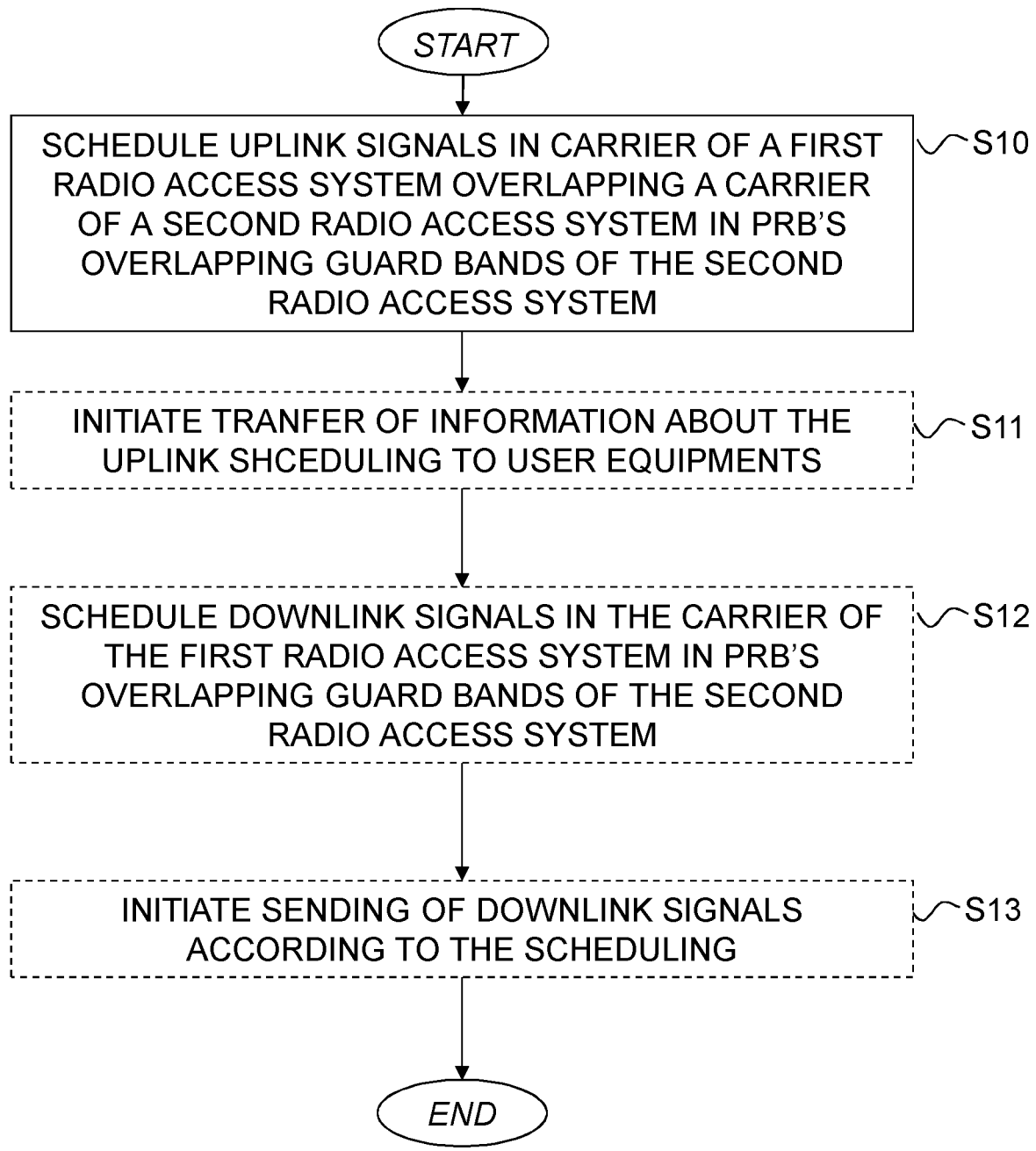
FIG. 10 is a schematic flow diagram illustrating steps of an embodiment of a method for signal scheduling.

FIG. 10 is a schematic flow diagram illustrating steps of an embodiment of a method for signal scheduling. In step S10, uplink signals are scheduled in a carrier of a first radio access system. This carrier overlaps a carrier of a second radio access system. The uplink signals are scheduled in PRB's that are overlapping with guard bands of the second radio access system.

In a preferred embodiment, the method further comprises the further step S11, in which initiating of a transfer of information about the uplink scheduling to user equipments is performed.

In a particular embodiment, the first radio access system is a NR system and the second radio access system is an LTE system.

In other words, in a first radio access system having a first carrier with a first carrier frequency band and a second carrier with a second carrier frequency band, uplink signals are scheduled in the second carrier. The second carrier is configured for FDD signalling. A useful frequency band of the second carrier frequency band is defined to, at least partially, overlap in frequency with useful frequency band of a third carrier having a third carrier frequency band of a second radio access system. The third carrier has an overlapping coverage area with the second carrier. The uplink signals that are scheduled to the second carrier are scheduled to PRBs of frequencies of the useful frequency band of the second carrier overlapping in frequency with guard bands of the third carrier.

In a particular embodiment, the first radio access system is a NR system and the second radio access system is an LTE system.

In one embodiment, the uplink signals comprise signals of short messages requiring low latency. One preferred type of short messages requiring low latency is signals controlling transmissions of first carrier. Another preferred type of short messages requiring low latency is messages short enough to benefit from the lower latency of the second carrier, by being transferred quicker than waiting for the corresponding direction on the first carrier. Yet another preferred type of short messages requiring low latency is messages related to a low latency QoS class.

Due to the limited capacity of the second carrier, the selection of messages to transfer on that channel is done carefully. As a summary, three types of messages are prioritized to use this channel. First of all, messages which enables efficient utilization of the first carrier, i.e. messages, that if waiting, interrupts the transfer of the first carrier. This is typically NR MAC ACK/NACK and end user traffic protocol ACK/NACK. ACK/NACK messages relating to high speed transfers or ACK/NACK messages for users with high path loss and thus difficult to signal UL on the first channel are prioritized among these.

The third type of messages are messages which relate to a quality of service requiring short latency, for instance safety applications or other machine-machine communication or industrial communication. These bearers are marked with special Quality-of-Service (QoS) class, and can be prioritized above the transfer of ACK/NACK related to the first carrier. The safety critical applications typically have very short messages, which can readily fit within the limited capacity available on the second carrier—tens or hundreds of bytes.

If spare capacity exist on the second carrier also after prioritizing these three kind of messages, it can be used for other traffic. Amongst this traffic, users with challenged UL coverage is typically prioritized.

In one embodiment, the uplink signals are comprised in uplink control channels.

Example of high priority small size transmissions are HARQ NACK, to inform the scheduler that a retransmission is needed. This is exemplified in FIG. 3, showing that the HARQ NACK may be sent on the lower channel (an FDD low band) allowing a fast retransmission on the mid band. Another example is a TCP IP NACK which informs higher layers that a retransmission is needed. Example if coverage challenged transmission can be HARQ ACK/NACK, TCP IP ACK/NACK and Machine Type Communication (MTC).

In other words, in one embodiment, the uplink control channels comprises ACK/NACK signalling. In a further embodiment, the uplink control channels comprises ACK/NACK signalling related to a medium access control layer of a transmission on the first carrier. In one embodiment, the uplink control channels comprises HARQ ACK/NACK signalling.

In another further embodiment, the uplink control channels comprises ACK/NACK signalling related to a traffic control protocol of an end-to-end service. In one embodiment, the uplink control channels comprises TCP ACK/NACK signalling. In another embodiment, the uplink control channels comprises QUIC ACK/NACK signalling.

Figure 11A:
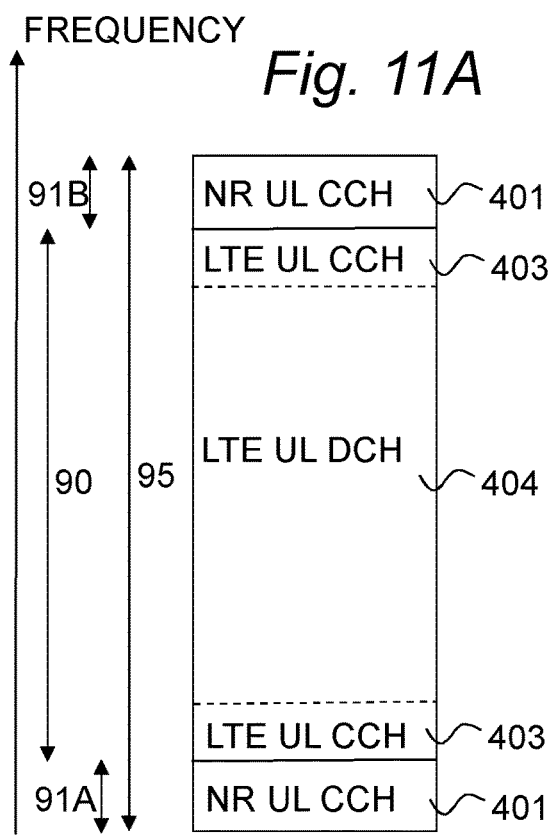
FIG. 11A is an embodiment of the use of frequencies of overlapping carriers for uplink signalling.

FIG. 11A illustrates a frequency band of the combined second and third carrier. In this example, NR and LTE are utilized as model systems for the first and second radio access systems, respectively. The useful frequency band 95 of the second carrier, i.e. the lowband carrier of the NR system, is utilized only by those PRB's 91A, 91B that are situated outside the useful frequency band 90 of the third carrier, i.e. the carrier of the LTE system. The frequency bands 91A and 91B are here utilized for scheduling of UL control channels 401.

In this particular example, the LTE system schedules control channels 403 at the frequencies closest to the respective ends of the useful frequency band 90 of the third carrier. Data channels 404 are scheduled in the middle of the useful frequency band 90 of the third carrier.

In case of spare capacity, also other UL data can be put on the NR part of the low band.

Figure 11B:
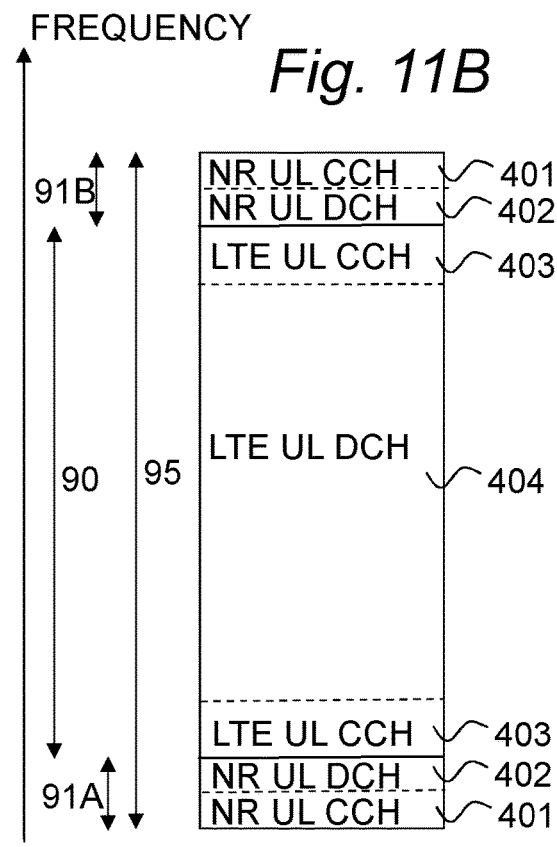
FIG. 11B is another embodiment of the use of frequencies of overlapping carriers for uplink signalling.

FIG. 11B illustrates another frequency band of the combined second and third carrier. Also in this example, NR and LTE are utilized as model systems for the first and second radio access systems, respectively. The frequency bands 91A and 91B are here utilized for scheduling of UL control channels 401 and for UL data channels 402.

In the embodiments involving NR/LTE systems, the above ideas are preferably implemented in the NR gNodeB. Potentially equipment, e.g. the low band radio unit, can be shared with the LTE system.

In a further embodiment, to get adequate UL capacity, the LTE cell may be configured with Physical Uplink Control Channel (PUCCH) over-dimensioning. In UL, the outer parts of the LTE allocation and the NR allocation are typically scheduled for the PUCCH. The amount of PUCCH is configurable, and the LTE can be configured to have more PUCCH PRBs than it intends to use. In other words, there are PRBs at the outer ends of the LTE carrier that are left unused and thus freeing more spectrum for NR to use. In such a case the used PRB for LTE PUCCH is placed on the "inner" part of the allocated region, i.e. those PRB closest to the centre frequency. This is called PUCCH overdimensioning and is a known feature in the LTE system.

Figure 11C:
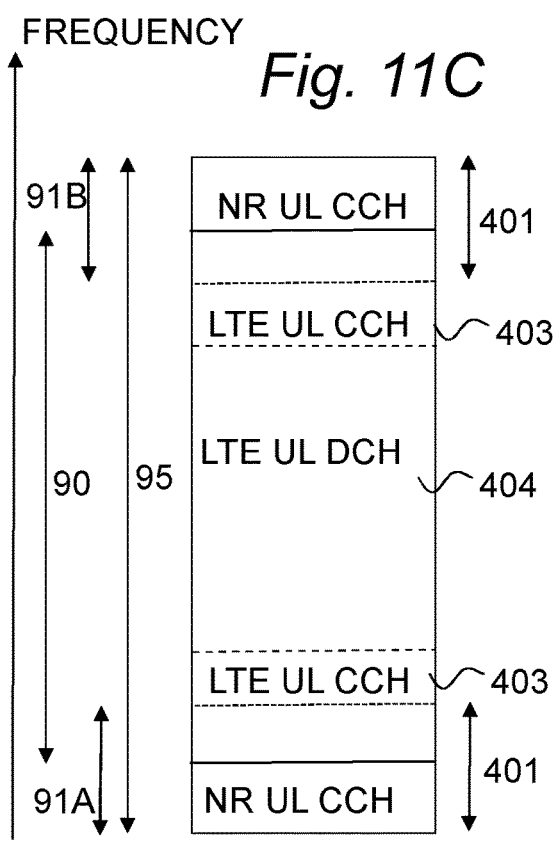
FIG. 11C is yet another embodiment of the use of frequencies of overlapping carriers for uplink signalling.

FIG. 11C illustrates a frequency band of the combined second and third carrier. In this example, NR and LTE are utilized as model systems for the first and second radio access systems, respectively. The useful frequency band 90 of the third carrier is used with overdimensioned PUCCH. The UL control channels 403 of the LTE system occupies the inner parts of the configured PUCCH frequencies and the outermost parts, in a frequency view, of the useful frequency band 90 of the third carrier is not utilized. UL control channels 401 for the NR system can thereby utilize also these free PRBs.

Figure 11D:
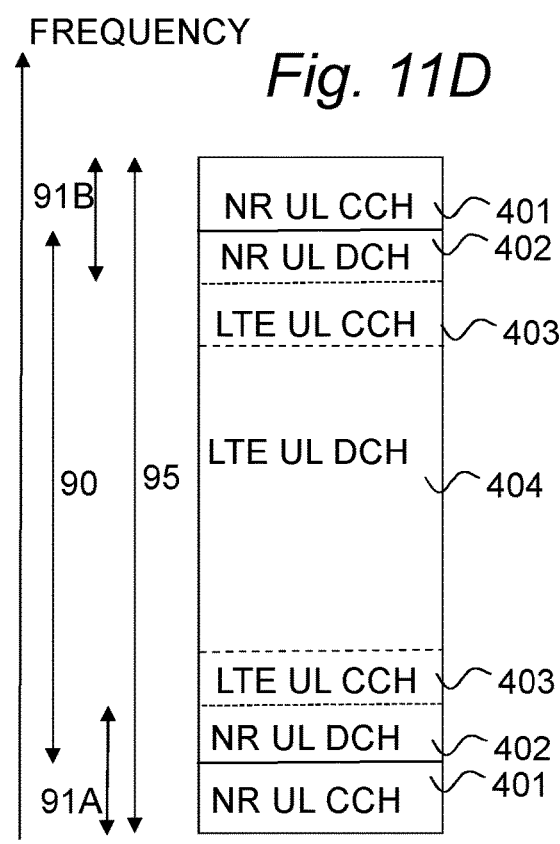
FIG. 11D is yet another embodiment of the use of frequencies of overlapping carriers for uplink signalling.

FIG. 11D illustrates a similar embodiment of overdimensioned PUCCH, but where the available frequencies are used for both control channels 401 and data channels 402 of the NR system.

In one embodiment, if the second radio access system is configured to utilize physical uplink control channel overdimensioning, scheduling is performed in the first radio access system, which scheduling schedules uplink signals in the second carrier at frequencies of the overdimensioned physical uplink control channel not being used by the second radio access system.

Preferably, the frequencies of the overdimensioned physical uplink control channel not being used by the second radio access system are in frequency situated at at least one outer edge of the useful frequency band of the third carrier.

For a configuration with Carrier Aggregation, the transmissions using the low band UL for PUCCH (HARQ ACK/NACK) has to have their PCell on the low band. This requires the PDCCH to be on the low band.

The scheduling ideas presented above may also applicable to the DL. Returning to FIG. 10, in the step S12, downlink signals are scheduled in the lowband carrier of the first radio access system. The downlink signals are scheduled in PRB's that are overlapping with guard bands of the second radio access system.

In other words, the method may preferably comprise the further step of scheduling downlink signals in the second carrier.

In a preferred embodiment, the method further comprises the further step S13, in which initiating of a sending of downlink signals according to the scheduling is performed.

In one embodiment, the downlink signals comprises signals of short messages requiring low latency.

The invention is possible to configure as either of Carrier Aggregation or Supplementary UL. For Supplementary UL, only the UL needs to use the concept. In case of Carrier Aggregation, also the DL needs to utilize this concept.

In DL NR-PDCCH CORESET can be used in combination with limiting of LTE PDSCH PRB available for LTE scheduling as a way of increasing DL capacity for NR.

In NR the PDCCH CORESET enables the possibility to move the configured PDCCH region for a UE in time and frequency. This is done by RRC signalling. As an example, start symbol for a PDCCH core set could be at OFDM symbol number 1. It is also possible to limit number of RBs in frequency domain.

By configuring a small enough (in RB) Core Set and transmitting it on the NR part of the low band spectrum, the NR usage again becomes transparent for the LTE UEs and BB. If not enough RB BW is available in the NR part of the low band it is possible to move NR PDCCH to the next symbol after LTE PDCCH. This allows the option to free up additional NR BW for NR PDCCH by limiting RB scheduling for PDSCH on LTE.

Figure 12:
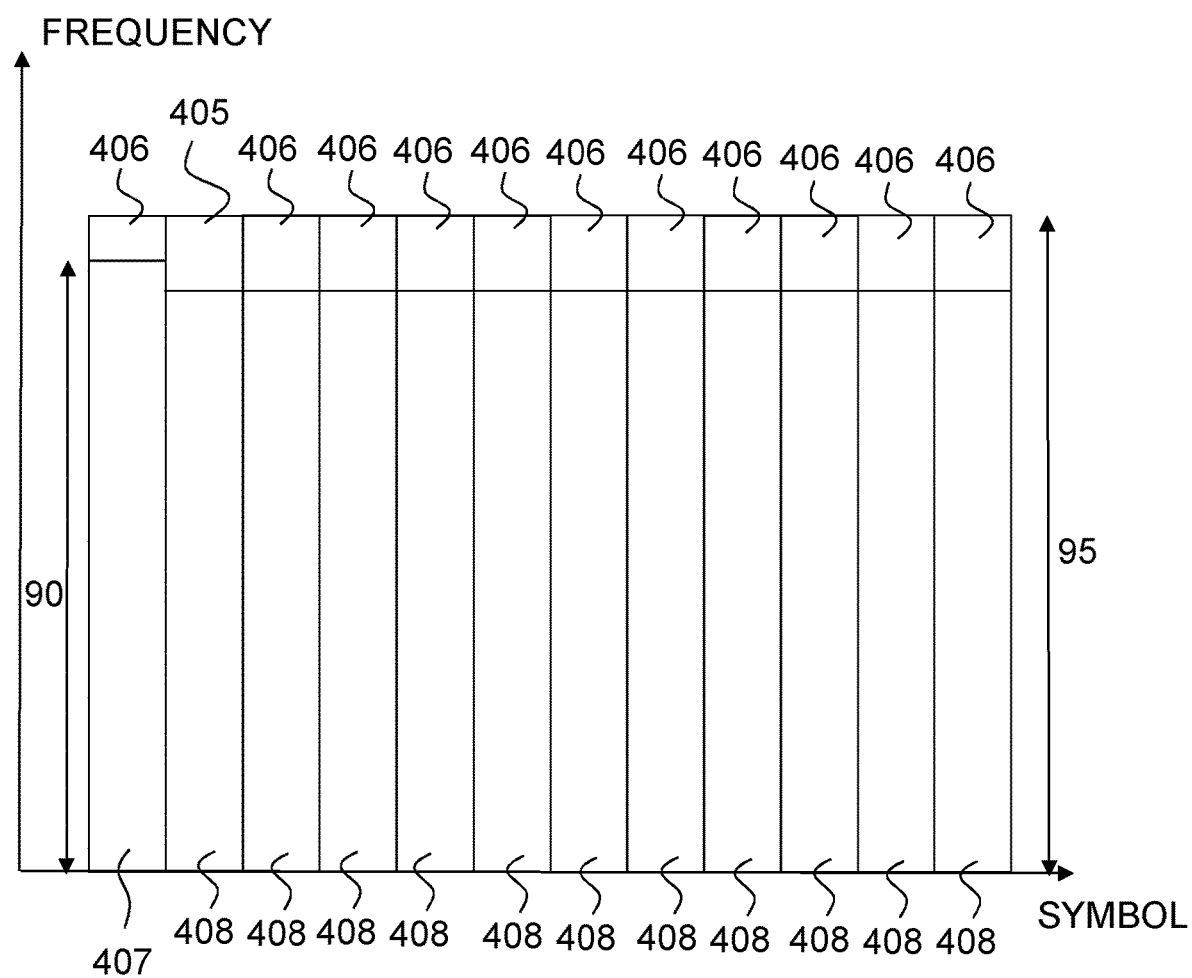
FIG. 12 is an embodiment of the use of frequencies of overlapping carriers for downlink signalling.

This is schematically illustrated in FIG. 12. In a first symbol, the LTE system schedules a Physical Downlink Control Channel (PDCCH) 407 utilizing the third carrier. In the following symbols, Physical Downlink Shared Channels (PDSCH) 408 are scheduled, however, with a limited RB utilization. In the NR system, the possibility to move the control channels to a next symbol is used. Thereby, the first symbol comprises a PDSCH 406 for the NR system. In the second symbol, where the NR has more available PRB's, a PDCCH 405 for the NR system is transmitted. In the following symbols, PDSCH 406 for the NR are scheduled.

The NR PDSCH can advantageously be used for coverage challenged transmissions and for low latency transmission during mid band UL TTIs.

The above mentioned ideas enables improvements both on coverage and latency. Defining e.g. an NR cell on the same frequencies as e.g. an LTE cell is defined, and selecting transmissions to be done in the NR cell, and scheduling these transmissions in the part of the NR cell frequency interval which is not overlapping with the LTE cell frequency interval, such advantages can be achieved. Preferably, transmissions with tougher requirements on coverage or latency than can be achieved by a first NR can be selected and these can be scheduled on a second NR cell, defined by the previous statement. Furthermore, overdimensioning the PUCCH of an LTE cell to increase the amount of spectrum available for the second NR cell is an additional preferred action. The first and second NR cells can be tied together by use of e.g. Supplementary UL. Also, by moving NR centre frequency with respect to the LTE centre frequency an increase in contiguous spectrum allocation for the second NR cell can be achieved. To further increase the amount of spectrum available for the second NR cell DL LTE PRB's for PDSCH can be avoided on the band edge. Moreover, PDCCH CORESET in NR can be used to avoid the LTE PDCCH region. The first and second NR cells can also be tied together by use of Carrier Aggregation, with the first or the second NR cell as PCell. The NR scheduler operates independently from the LTE scheduler, despite that it schedules transmission on the same channel as LTE. However, the scheduling takes place on spectrum parts that are in beforehand known not to be allocated by the LTE scheduler.

In other words, in one embodiment, if the second radio access system is configured to utilize limited resource block scheduling for physical downlink shared channels, scheduling of downlink signals in the second carrier in the first radio access system is performed at frequencies and time slots of the useful frequency band of the third carrier not being used by the second radio access system due to the limited resource block scheduling.

Preferably, the frequencies of the useful frequency band of the third carrier not being used by the second radio access system due to the limited resource block scheduling are in frequency situated at at least one outer edge of the useful frequency band of the third carrier.

Preferably, the scheduling of downlink signals in the second carrier comprises scheduling of downlink control channels in a time slot different from a first time slot.

As used herein, the non-limiting terms "User Equipment (UE)", "station (STA)" and "wireless communication device" or "wireless device" may refer to a mobile phone, a cellular phone, a Personal Digital Assistant (PDA) equipped with radio communication capabilities, a smart phone, a laptop or Personal Computer (PC) equipped with an internal or external mobile broadband modem, a tablet PC with radio communication capabilities, a target device, a device to device UE, a machine type UE or UE capable of machine to machine communication, iPAD, Customer Premises Equipment (CPE), Laptop Embedded Equipment (LEE), Laptop Mounted Equipment (LME), Universal Serial Bus (USB) dongle, a portable electronic radio communication device, a sensor device equipped with radio communication capabilities or the like. In particular, the term "UE", the term "Station", the term "wireless device" and the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the non-limiting term "network node" may refer to base stations, access points, network control nodes such as network controllers, radio network controllers, base station controllers, access controllers, and the like. In particular, the term "base station" may encompass different types of radio base stations including standardized base stations such as Node Bs (NB), or evolved Node Bs (eNB) and also macro/micro/pico radio base stations, home base stations, also known as femto base stations, relay nodes, repeaters, radio access points, Base Transceiver Stations (BTS), and even radio control nodes controlling one or more Remote Radio Units (RRU), or the like.

In the following, the general non-limiting term "communication unit" includes network nodes and/or associated wireless devices.

As used herein, the term "network device" may refer to any device located in connection with a communication network, including but not limited to devices in access networks, core networks and similar network structures. The term network device may also encompass cloud-based network devices.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect of the proposed technology there is provided a network node configured to operate in a radio access system. The network node is further configured to configure a first carrier having a first carrier frequency band and a second carrier having a second carrier frequency band for use for radio access in a first radio access system. The second carrier is configured for frequency division duplex signalling. A useful frequency band of the second carrier is defined to, at least partially, overlap in frequency with a useful frequency band of a third carrier having a third carrier frequency band of a second radio access system. The third carrier has an overlapping coverage area with the second carrier. At least a part of the useful frequency band of the second carrier overlaps in frequency with guard bands of the third carrier.

Figure 13:
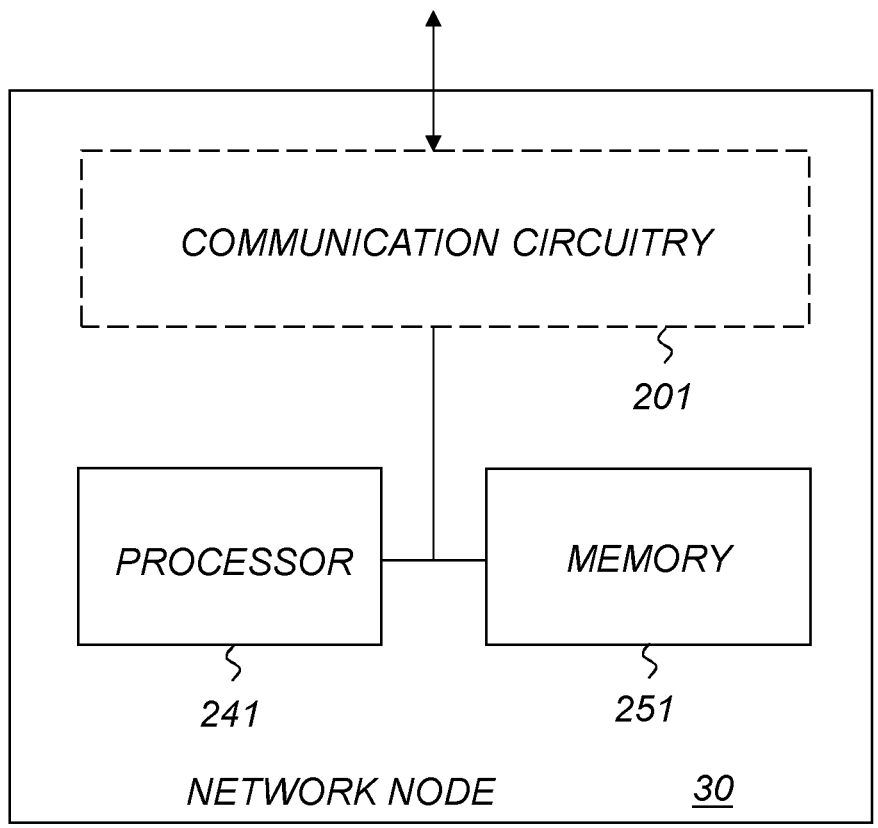
FIG. 13 is a schematic block diagram illustrating an embodiment of a network node.

FIG. 13 is a schematic block diagram illustrating an example of a network node 30, based on a processor-memory implementation according to an embodiment. In this particular example, the network node 30 comprises a processor 241 and a memory 251, the memory 251 comprising instructions executable by the processor 241. Thereby the processor 241 is operative to configure a first carrier having a first carrier frequency band and a second carrier having a second carrier frequency band for use for radio access in a first radio access system.

In one embodiment, the network node is configured to initiating transfer of configuration information to schedulers in the first radio access system.

To this end, optionally, the network node 30 may also include a communication circuitry 201. The communication circuitry 201 may include functions for wired and/or wireless communication with other devices and/or network nodes in the network. In a particular example, the communication circuitry 201 may be based on radio circuitry for communication with one or more other nodes, including transmitting and/or receiving information. The communication circuit 201 may be interconnected to the processor 241 and/or memory 251. By way of example, the communication circuit 201 may include any of the following: a receiver, a transmitter, a transceiver, input/output (I/O) circuitry, input port(s) and/or output port(s). The communication circuit 201 is operative to initiate transfer of configuration information to schedulers in the first radio access system.

According to another aspect of the proposed technology there is provided a network node configured to schedule, for a first radio access system having a first carrier with a first carrier frequency band and a second carrier with a second carrier frequency band, uplink signals in the second carrier. The second carrier is configured for frequency division duplex signalling. A useful frequency band of the second carrier frequency band is defined to, at least partially, overlap in frequency with a useful frequency band of a third carrier having a third carrier frequency band of a second radio access system. The third carrier has an overlapping coverage area with the second carrier. The uplink signals scheduled to the second carrier are scheduled to physical resource blocks of frequencies of the useful frequency band of the second carrier overlapping in frequency with guard bands of the third carrier.

A network node of this other aspect can also be illustrated by FIG. 13. In this case the processor 241 is operative to schedule uplink signals in the second carrier.

In one embodiment, the network node is further configured to initiate transfer of information about the uplink scheduling to user equipments.

In the network node of FIG. 13, the communication circuit 209 is operative to initiate transfer of information about the uplink scheduling to user equipments.

In one embodiment, the network node is further configured to initiate sending of downlink signals according to the scheduling.

In the network node of FIG. 13, the communication circuit 209 is operative to initiate sending of downlink signals according to the scheduling.

Figure 14:
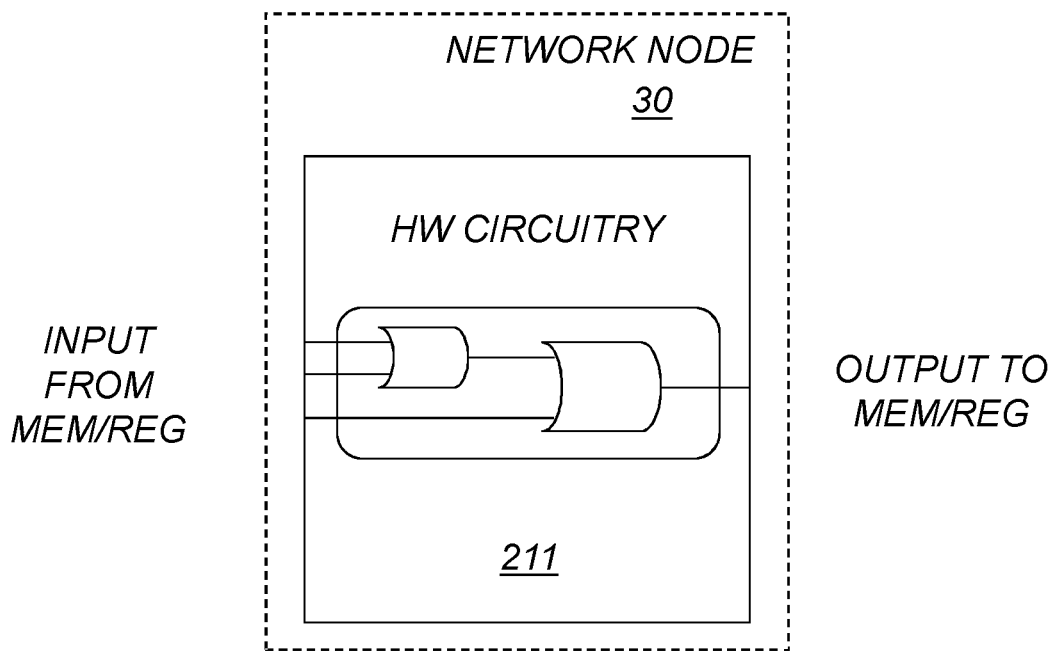
FIG. 14 is a schematic block diagram illustrating an embodiment of a network node based on a hardware circuitry implementation.

FIG. 14 is a schematic block diagram illustrating another example of a network node 30, based on a hardware circuitry implementation according to an embodiment. Particular examples of suitable hardware (HW) circuitry 211 include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figure 15:
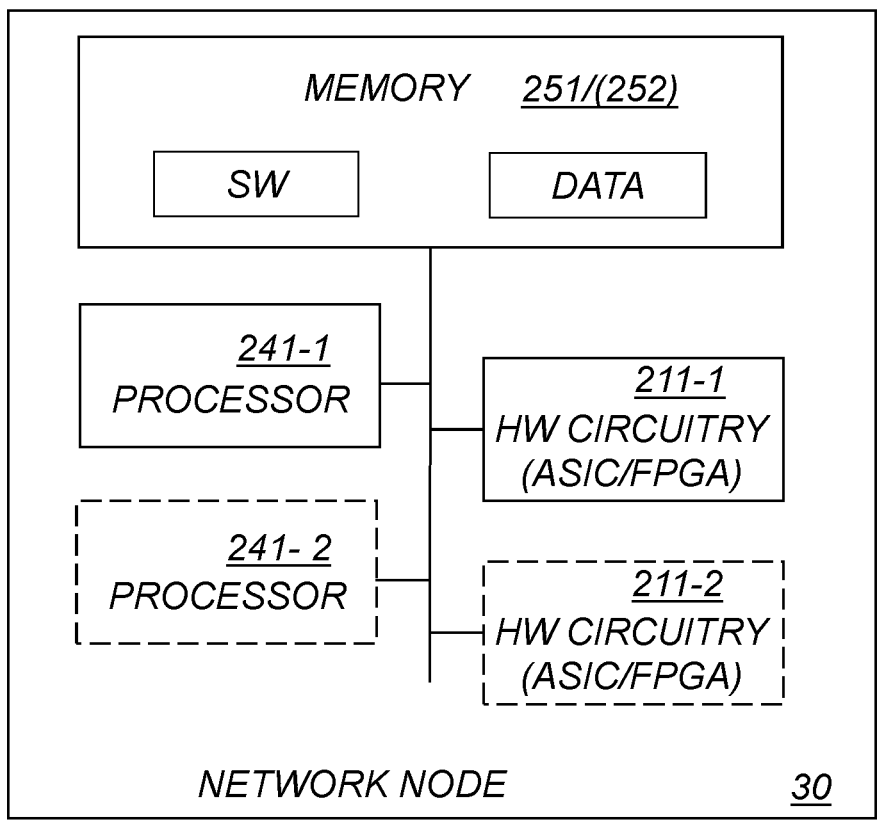
FIG. 15 is a schematic block diagram illustrating another embodiment of a network node based on combination of both processor and hardware circuitry.

FIG. 15 is a schematic block diagram illustrating yet another example of a network node 30, based on combination of both processor(s) 241-1, 241-2 and hardware circuitry 211-1, 211-2 in connection with suitable memory unit(s) 251. The network node 30 comprises one or more processors 241-1, 241-2, memory 251 including storage for software and data, and one or more units of hardware circuitry 211-1, 211-2 such as ASICs and/or FPGAs. The overall functionality is thus partitioned between programmed software (SW) for execution on one or more processors 241-1, 241-2, and one or more pre-configured or possibly reconfigurable hardware circuits 211-1, 211-2 such as ASICs and/or FPGAs. The actual hardware-software partitioning can be decided by a system designer based on a number of factors including processing speed, cost of implementation and other requirements.

Alternatively, or as a complement, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 16:
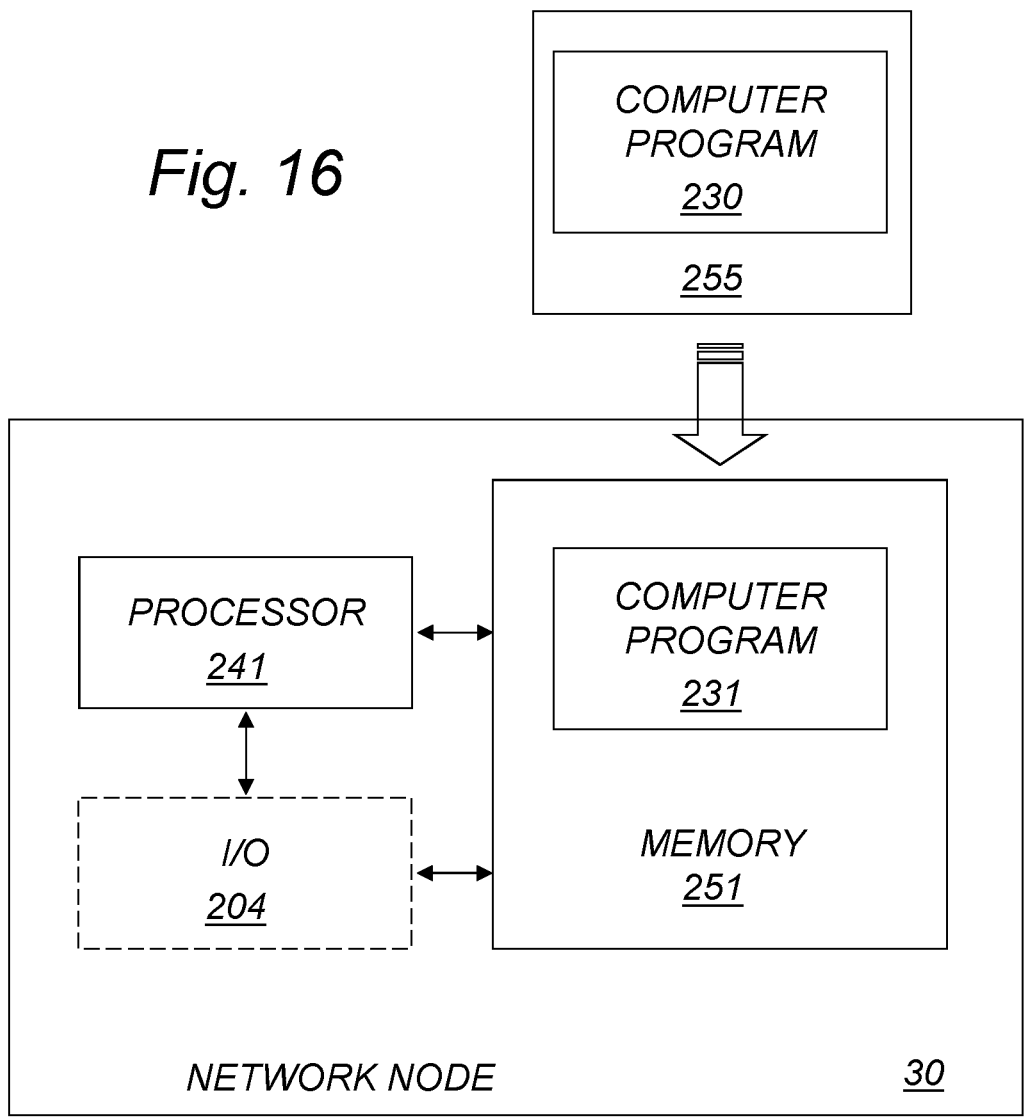
FIG. 16 is a schematic diagram illustrating an embodiment of a computer-implementation of a network node.

FIG. 16 is a schematic diagram illustrating an embodiment of a computer-implementation of a network node 30. In this particular embodiment, at least some of the steps, functions, procedures, modules and/or blocks described herein are implemented in a computer program 231, which is loaded into the memory 251 for execution by processing circuitry including one or more processors 241. The processor(s) 241 and memory 251 are interconnected to each other to enable normal software execution. An optional input/output device 204 may also be interconnected to the processor(s) 241 and/or the memory 251 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 241 is thus configured to perform, when executing the computer program 231, well-defined processing tasks such as those described herein. The terms "processing circuitry" and "processor" will in the present disclosure be used as synonymous expressions.

The processing circuitry does not have to be dedicated to only execute the above-described steps, functions, procedure and/or blocks, but may also execute other tasks.

In a particular embodiment, the computer program 231 comprises instructions, which when executed by at least one processor 241, cause the processor(s) 241 to configure a first carrier having a first carrier frequency band and a second carrier having a second carrier frequency band for use for radio access in a first radio access system. The second carrier is configured for frequency division duplex signalling. A useful frequency band of the second carrier is defined to, at least partially, overlap in frequency with a useful frequency band of a third carrier having a third carrier frequency band of a second radio access system. The third carrier has an overlapping coverage area with the second carrier. At least a part of the useful frequency band of the second carrier overlaps in frequency with guard bands of the third carrier.

In another particular embodiment, the computer program 231 comprises instructions, which when executed by at least one processor 241, cause the processor(s) 241 to schedule, for a first radio access system having a first carrier with a first carrier frequency band and a second carrier with a second carrier frequency band, uplink signals in the second carrier. The second carrier is configured for frequency division duplex signalling. A useful frequency band of the second carrier is defined to, at least partially, overlap in frequency with a useful frequency band of a third carrier having a third carrier frequency band of a second radio access system. The third carrier has an overlapping coverage area with the second carrier. The uplink signals scheduled to the second carrier are scheduled to physical resource blocks of frequencies of the useful frequency band of the second carrier overlapping in frequency with guard bands of the third carrier.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 230; 231 may be realized as a computer program product, which is normally carried or stored on a computer-readable medium 255; 251, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

Figure 17:
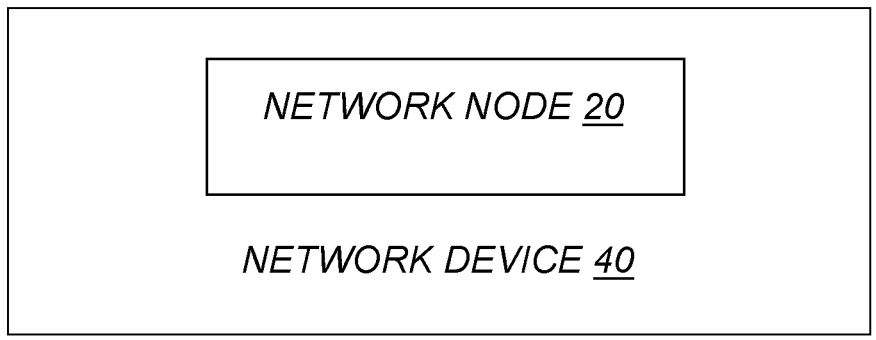
FIG. 17 is a schematic block diagram illustrating an embodiment of a network device.

FIG. 17 is a schematic block diagram illustrating an example of a network device (ND) 40 comprising a network node 30 according to any of the embodiments.

According to an aspect, there is provided a network device 40 comprising a network node 30 as described herein.

The network device may be any suitable network device in the wireless communication system, or a network device in connection with the wireless communication system. By way of example, the network device may be a suitable network node such a base station or an access point. However, the network device may alternatively be a cloud-implemented network device.

According to another aspect, there is provided a communication unit 10 in a wireless communication system, wherein the communication unit 10 comprises a network node 30 as described herein. The communication unit may be any suitable communication unit in the wireless communication system. By way of example, the communication unit may be a wireless communication device such as a UE, STA or similar end-user device.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 18A:
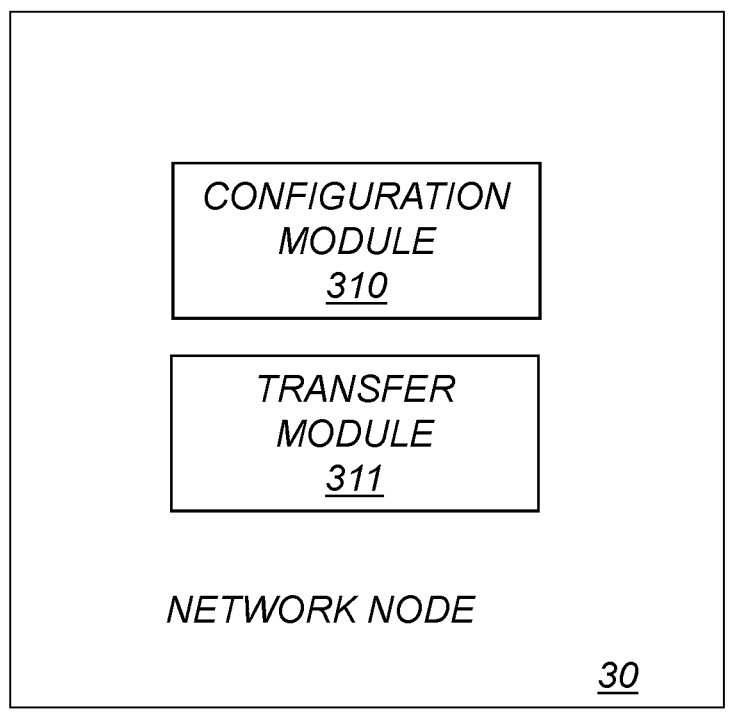
FIG. 18A is a schematic diagram illustrating an embodiment of a network node.

FIG. 18A is a schematic diagram illustrating an example of a network node for operating in a radio access system. The network node 30 comprises a configuration module 310, configured for configure a first carrier having a first carrier frequency band and a second carrier having a second carrier frequency band for use for radio access in a first radio access system. The second carrier is configured for frequency division duplex signalling. A useful frequency band of the second carrier is defined to, at least partially, overlap in frequency with a useful frequency band of a third carrier having a third carrier frequency band of a second radio access system. The third carrier has an overlapping coverage area with the second carrier. At least a part of the useful frequency band of the second carrier overlaps in frequency with guard bands of the third carrier.

Preferably, the network node 30 further comprises a transfer module 311, for initiating transfer of configuration information to schedulers in the first radio access system.

Figure 18B:
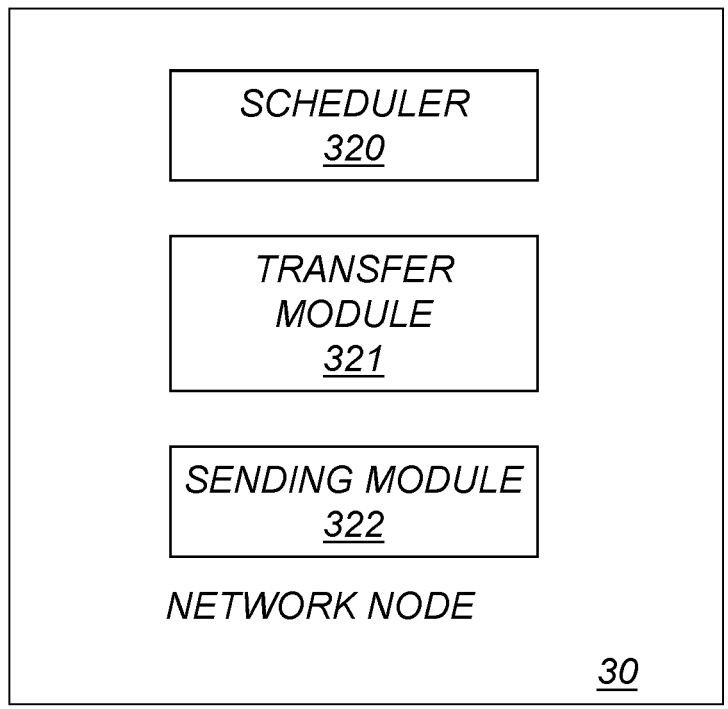
FIG. 18B is another schematic diagram illustrating another embodiment of a network node.

FIG. 18B is a schematic diagram illustrating an example of a network node for performing signal scheduling. The network node 30 comprises a scheduler 320, configured for scheduling, for a first radio access system having a first carrier with a first carrier frequency band and a second carrier with a second carrier frequency band, uplink signals in the second carrier. The second carrier is configured for frequency division duplex signalling. A useful frequency band of the second carrier is defined to, at least partially, overlap in frequency with a useful frequency band of a third carrier having a third carrier frequency band of a second radio access system. The third carrier has an overlapping coverage area with the second carrier. The uplink signals scheduled to the second carrier are scheduled to physical resource blocks of frequencies of the useful frequency band of the second carrier overlapping in frequency with guard bands of the third carrier.

Preferably, the network node 30 further comprises a transfer module 321, for initiating transfer of information about uplink scheduling to user equipments.

Preferably, the network node 30 further comprises a sending module 322, for initiating sending of downlink signals according to the scheduling.

Alternatively it is possible to realize the module(s) in FIGS. 18A and 18B predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centres, in other scenarios it may in fact be beneficial to distribute functionality over different parts of the network.

Figure 19:
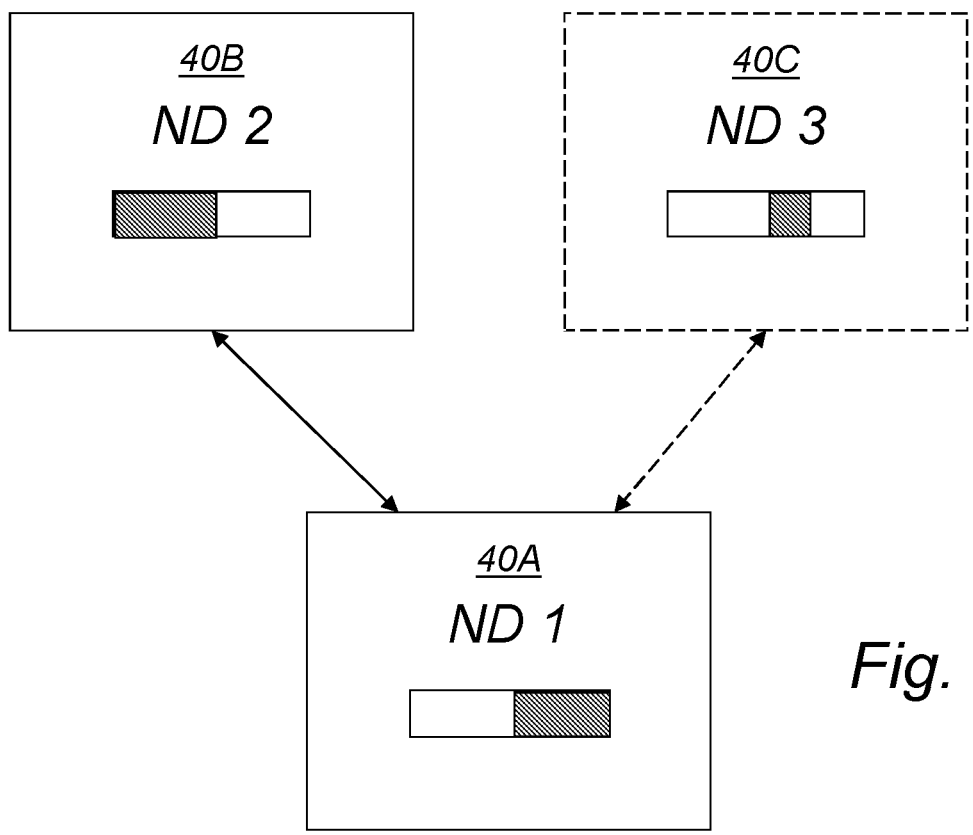
FIG. 19 is a schematic diagram illustrating a general example of functionality distribution or partition.

FIG. 19 is a schematic diagram illustrating an example of how functionality can be distributed or partitioned between different Network Devices (ND) in a general case. In this example, there are at least two individual, but interconnected network devices, ND 1 and ND 2, with reference numerals 40A and 40B, respectively, which may have different functionalities, or parts of the same functionality, partitioned between the network devices 40A and 40B. There may be additional network devices, such as ND 3, with reference numeral 40C, being part of such a distributed implementation. The network devices 40A-C may be part of the same wireless communication system, or one or more of the network devices may be so-called cloud-based network devices located outside of the wireless communication system.

Figure 20:
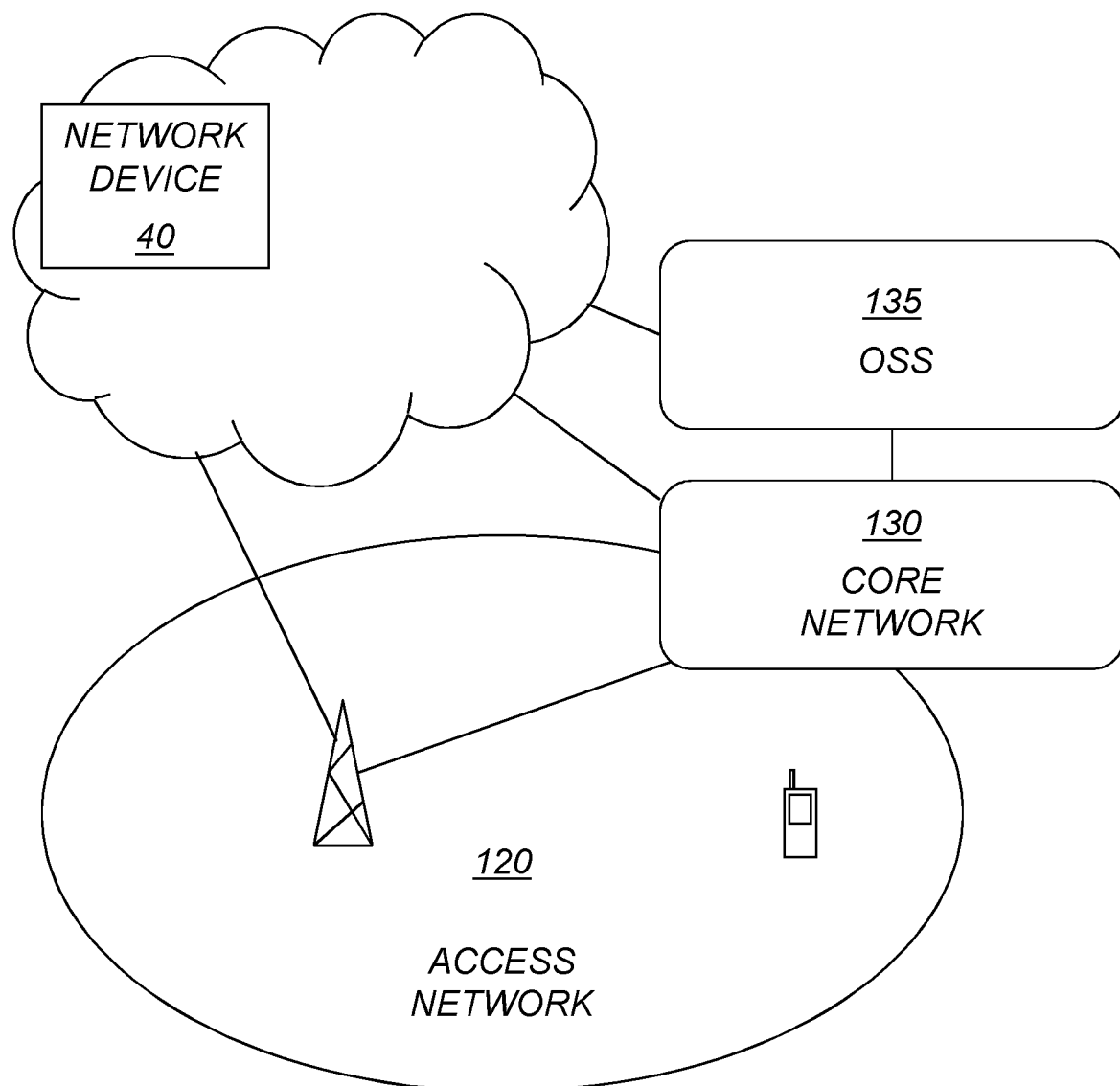
FIG. 20 is a schematic diagram illustrating an example of a wireless communication system in cooperation with one or more cloud-based network devices.

FIG. 20 is a schematic diagram illustrating an example of a wireless communication system, including an access network 120 and/or a core network 130 and/or an Operations and Support System (OSS), 135 in cooperation with one or more cloud-based network devices 40. Functionality relevant for the access network 120 and/or the core network 130 and/or the OSS system 135 may be at least partially implemented for execution in a cloud-based network device 40, with suitable transfer of information between the cloud-based network device and the relevant network nodes and/or communication units in the access network and/or the core network and/or the OSS system.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use Common Off-The-Shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a Wireless Network Interface Controller (WNIC) or through plugging in a cable to a physical port connected to a Network Interface Controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV). Thus, NFV may be used to consolidate many network equipment types onto industry standard high volume server hardware, physical switches, and physical storage, which could be located in data centres, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a ND. In certain embodiments of such a hybrid network device, a platform Virtual Machine (VM), such as a VM that implements functionality of a special-purpose network device, could provide for para-virtualization to the hardware present in the hybrid network device.

Figure 21:
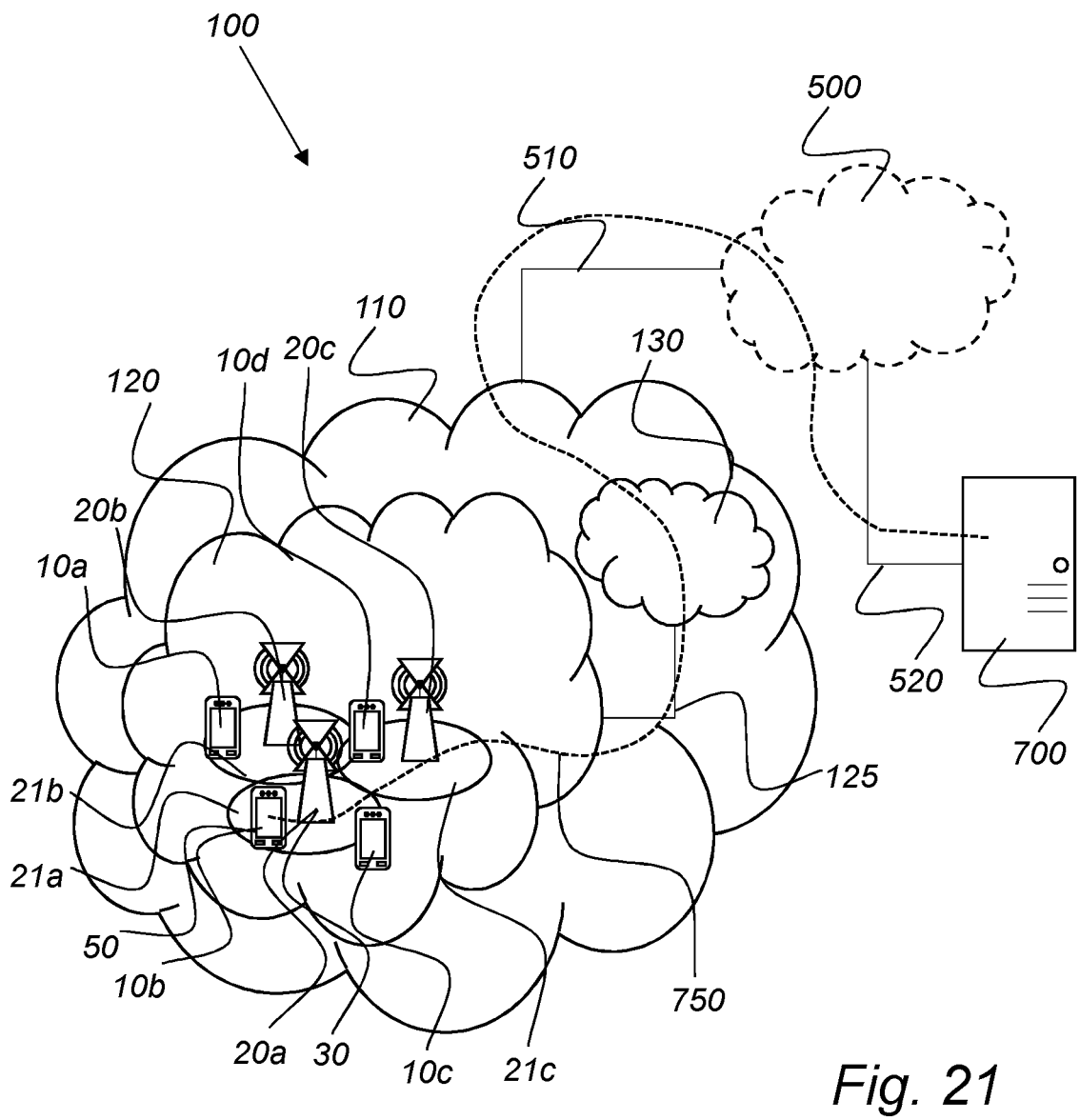
FIG. 21 schematically illustrates a telecommunication network connected via an intermediate network to a host computer.

With reference to FIG. 21, in accordance with an embodiment, a communication system 100 includes a telecommunication network 110, such as a 3GPP-type cellular network, which comprises an access network 120, such as a Radio Access Network (RAN), and a Core Network (CN) 130. The access network 120 comprises a plurality of base stations 20a, 20b, 20c, such as Node Bs (NB), evolved Node Bs (eNB), New Radio Node Bs (gNB) or other types of wireless access points, each defining a corresponding coverage area 21a, 21b, 21c. Each base station 20a, 20b, 20c is connectable to the CN 130 over a wired or wireless connection 125. A first user equipment (UE) 10a located in coverage area 21c is configured to wirelessly connect to, or be paged by, the corresponding base station 20c. A second UE 10b in coverage area 21a is wirelessly connectable to the corresponding base station 20a. While a plurality of UEs 10a-d are illustrated in this example, the disclosed embodiments are equally applicable to a situation where a sole UE is in the coverage area or where a sole UE is connecting to the corresponding base station 20.

The base station 20 is one type of a network node 30. Many operations that in a typical applications are performed in a base station 20 may alternatively be performed in another network node 30 or even in a node external to the telecommunication network 110. The devices and methods described here below as being performed in a base station 20 should be interpreted as also being possible to perform in a general network node 30.

The UE 10 is one type of a wireless device 11. Many operations that in a typical applications are performed in a UE 10 may alternatively be performed in any other wireless device 11. The devices and methods described here below as being performed in a UE 10 should be interpreted as also being possible to perform in a general wireless device 11.

The telecommunication network 110 is itself connected to a host computer 700, which may be embodied in the hardware and/or software of a standalone server, a cloud implemented server, a distributed server or as processing resources in a server farm. The host computer 700 may be under the ownership or control of a service provider, or may be operated by the service provider or on behalf of the service provider. The connections 510, 520 between the telecommunication network 110 and the host computer 700 may extend directly from the CN 130 to the host computer 700 or may go via an optional intermediate network 500. The intermediate network 500 may be one of, or a combination of more than one of, a public, private or hosted network; the intermediate network 500, if any, may be a backbone network or the Internet; in particular, the intermediate network 500 may comprise two or more sub-networks (not shown).

The communication system of FIG. 21 as a whole enables connectivity between one of the connected UEs 10a-d and the host computer 700. The connectivity may be described as an over-the-top (OTT) connection 750. The host computer 700 and the connected UEs 10a-d are configured to communicate data and/or signalling via the OTT connection 750, using the access network 120, the CN 130, any intermediate network 500 and possible further infrastructure (not shown) as intermediaries. The OTT connection 750 may be transparent in the sense that the participating communication devices through which the OTT connection 750 passes are unaware of routing of uplink and downlink communications. For example, a base station 20 may not or need not be informed about the past routing of an incoming downlink communication with data originating £rom a host computer 700 to be forwarded (e.g., handed over) to a connected UE 10. Similarly, the base station 20 need not be aware of the future routing of an outgoing uplink communication originating from the UE 10 towards the host computer 700.

Example implementations, in accordance with an embodiment, of the UE, base station and host computer discussed in the preceding paragraphs will now be described with reference to FIG. 22. In a communication system 100, a host computer 700 comprises hardware 710 including a communication interface 730 configured to set up and maintain a wired or wireless connection with an interface of a different communication device of the communication system 100. The host computer 700 further comprises processing circuitry 740, which may have storage and/or processing capabilities. In particular, the processing circuitry 740 may comprise one or more programmable processors, application-specific integrated circuits, field programmable gate arrays or combinations of these (not shown) adapted to execute instructions. The host computer 700 further comprises software 720, which is stored in or accessible by the host computer 700 and executable by the processing circuitry 740. The software 720 includes a host application 722. The host application 722 may be operable to provide a service to a remote user, such as a UE 10 connecting via an OTT connection 750 terminating at the UE 10 and the host computer 700. In providing the service to the remote user, the host application 722 may provide user data which is transmitted using the OTT connection 750.

The communication system 100 further includes a base station 20 provided in a telecommunication system and comprising hardware 155 enabling it to communicate with the host computer 700 and with the UE 10. The hardware 155 may include a communication interface 150 for setting up and maintaining a wired or wireless connection with an interface of a different communication device of the communication system 100, as well as a radio interface 160 for setting up and maintaining at least a wireless connection 165 with a UE 10 located in a coverage area (not shown in FIG. 22) served by the base station 20. The communication interface 150 may be configured to facilitate a connection 151 to the host computer 700. The connection 151 may be direct or it may pass through a CN (not shown in FIG. 22) of the telecommunication system and/or through one or more intermediate networks outside the telecommunication system. In the embodiment shown, the hardware 155 of the base station 20 further includes processing circuitry 170, which may comprise one or more programmable processors, application-specific integrated circuits, field programmable gate arrays or combinations of these (not shown) adapted to execute instructions. The base station 20 further has software 156 stored internally or accessible via an external connection.

The communication system 100 further includes the UE 10 already referred to. It's hardware 185 may include a radio interface 180 configured to set up and maintain a wireless connection 165 with a base station serving a coverage area in which the UE 10 is currently located. The hardware 185 of the UE 10 further includes processing circuitry 190, which may comprise one or more programmable processors, application-specific integrated circuits, field programmable gate arrays or combinations of these (not shown) adapted to execute instructions. The UE 10 further comprises software 186, which is stored in or accessible by the UE 10 and executable by the processing circuitry 190. The software 186 includes a client application 192. The client application 192 may be operable to provide a service to a human or non-human user via the UE 10, with the support of the host computer 700. In the host computer 700, an executing host application 722 may communicate with the executing client application 192 via the OTT connection 750 terminating at the UE 10 and the host computer 700. In providing the service to the user, the client application 192 may receive request data from the host application 722 and provide user data in response to the request data. The OTT connection 750 may transfer both the request data and the user data. The client application 192 may interact with the user to generate the user data that it provides.

Figure 22:
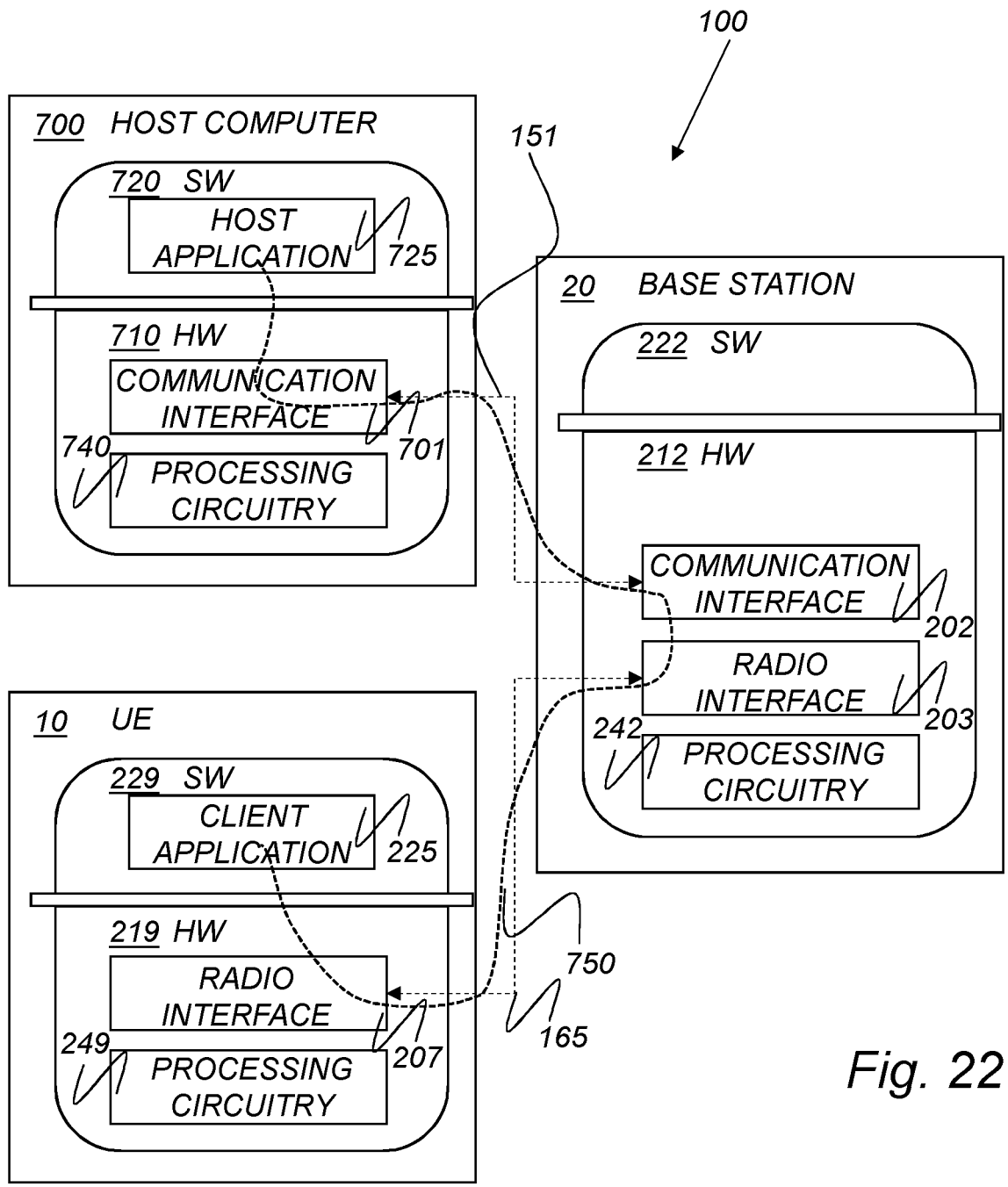
FIG. 22 is a generalized block diagram of a host computer communicating via a base station with a user equipment over a partially wireless connection.

It is noted that the host computer 700, base station 20 and UE 10 illustrated in FIG. 22 may be identical to the host computer 700, one of the base stations 20a, 20b, 20c and one of the UEs 10a-d of FIG. 21, respectively. This is to say, the inner workings of these entities may be as shown in FIG. 22 and independently, the surrounding network topology may be that of FIG. 21.

In FIG. 22, the OTT connection 750 has been drawn abstractly to illustrate the communication between the host computer 700 and the use equipment 10 via the base station 20, without explicit reference to any intermediary devices and the precise routing of messages via these devices. Network infrastructure may determine the routing, which it may be configured to hide from the UE 10 or from the service provider operating the host computer 700, or both. While the OTT connection 750 is active, the network infrastructure may further take decisions by which it dynamically changes the routing (e.g., on the basis of load balancing consideration or reconfiguration of the network).

The wireless connection 165 between the UE 10 and the base station 20 is in accordance with the teachings of the embodiments described throughout this disclosure. One or more of the various embodiments improve the performance of OTT services provided to the UE 10 using the OTT connection 700, in which the wireless connection 165 forms the last segment. More precisely, the teachings of these embodiments may improve the latency and coverage and thereby provide benefits such as reduced user waiting time and a more reliable coverage.

A measurement procedure may be provided for the purpose of monitoring data rate, latency and other factors on which the one or more embodiments improve. There may further be an optional network functionality for reconfiguring the OTT connection 750 between the host computer 700 and UE 10, in response to variations in the measurement results. The measurement procedure and/or the network functionality for reconfiguring the OTT connection 750 may be implemented in the software 720 of the host computer 700 or in the software 186 of the UE 10, or both. In embodiments, sensors (not shown) may be deployed in or in association with communication devices through which the OTT connection 750 passes; the sensors may participate in the measurement procedure by supplying values of the monitored quantities exemplified above, or supplying values of other physical quantities from which software 720, 186 may compute or estimate the monitored quantities. The reconfiguring of the OTT connection 750 may include message format, retransmission settings, preferred routing etc.; the reconfiguring need not affect the base station 20, and it may be unknown or imperceptible to the base station 20. Such procedures and functionalities may be known and practiced in the art. In certain embodiments, measurements may involve proprietary UE signalling facilitating the host computer's 700 measurements of throughput, propagation times, latency and the like. The measurements may be implemented in that the software 720 causes messages to be transmitted, in particular empty or 'dummy' messages, using the OTT connection 750 while it monitors propagation times, errors etc.

Figure 23:
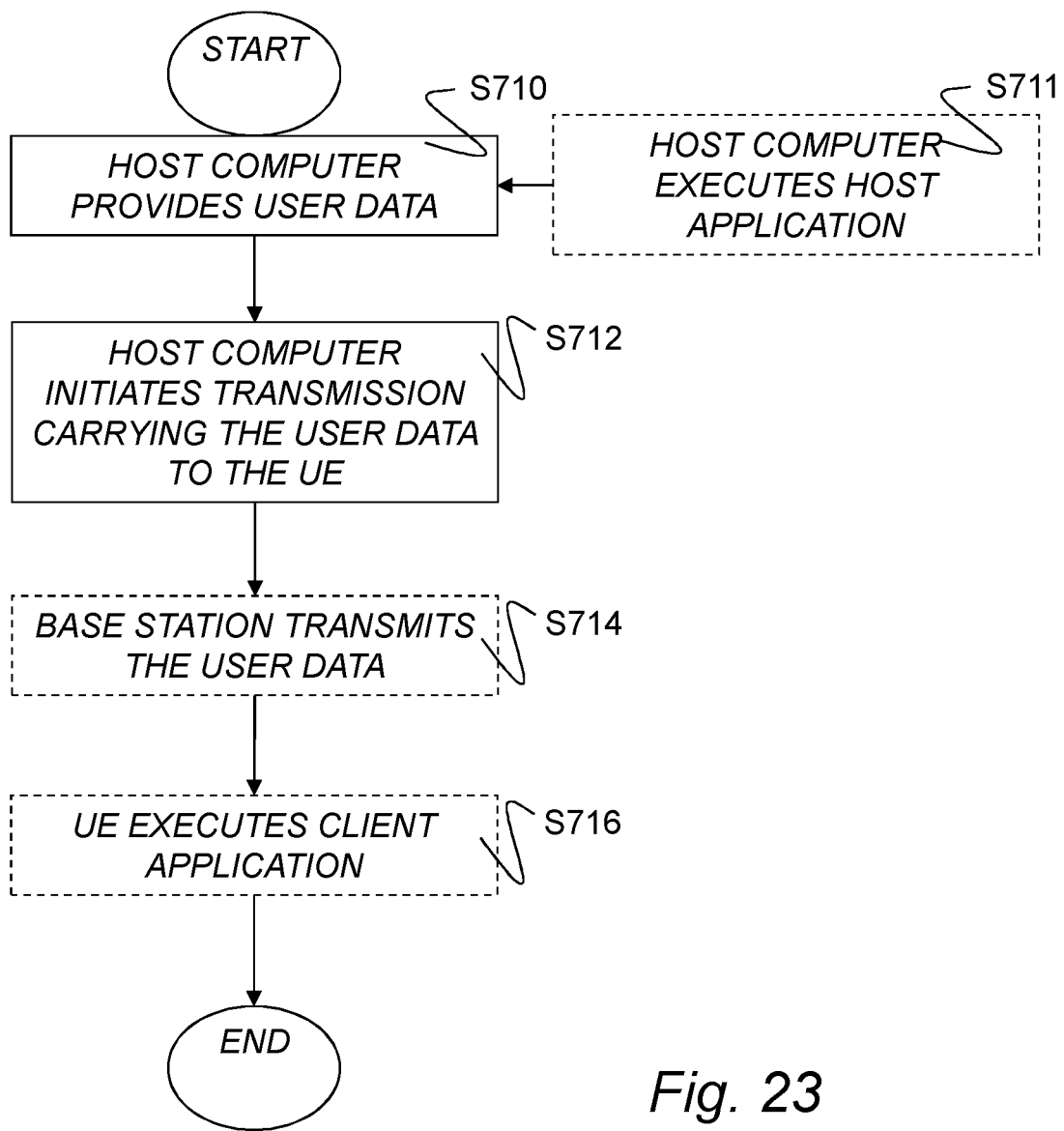
FIGS. 23-26 are flowcharts illustrating methods implemented in a communication system including a host computer, a base station and a user equipment.

FIG. 23 is a flowchart illustrating a method implemented in a communication system, in accordance with one embodiment. The communication system includes a host computer, a base station and a UE which may be those described with reference to FIGS. 21 and 22. For simplicity of the present disclosure, only drawing references to FIG. 23 will be included in this section. In a first step S710 of the method, the host computer provides user data. In an optional substep S711 of the first step S710, the host computer provides the user data by executing a host application. In a second step S712, the host computer initiates a transmission carrying the user data to the UE. In an optional third step S714, the base station transmits to the UE the user data which was carried in the transmission that the host computer initiated, in accordance with the teachings of the embodiments described throughout this disclosure. In an optional fourth step S716, the UE executes a client application associated with the host application executed by the host computer.

Figure 24:
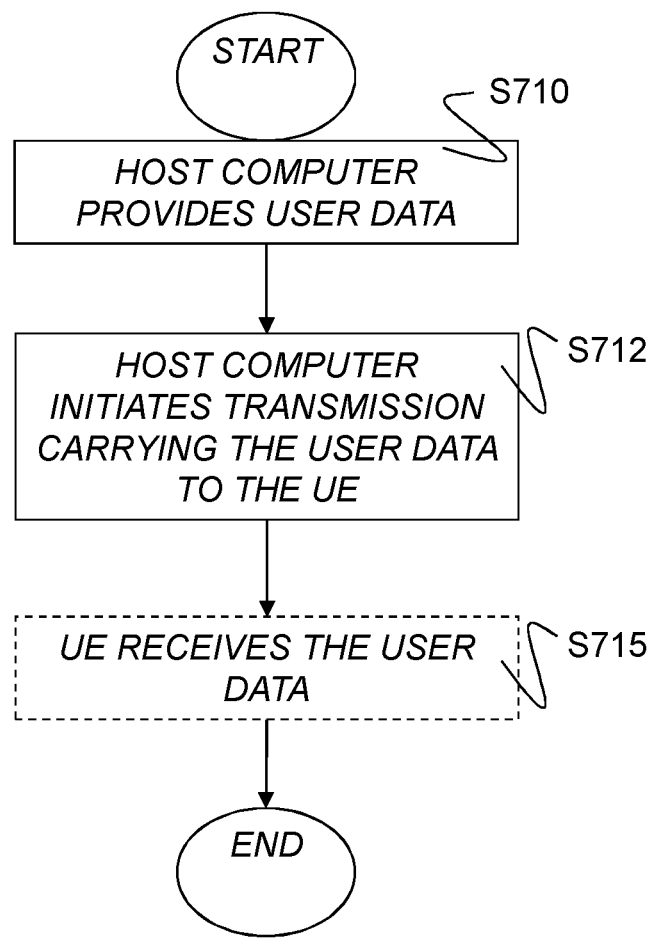

FIG. 24 is a flowchart illustrating a method implemented in a communication system, in accordance with one embodiment. The communication system includes a host computer, a base station and a UE which may be those described with reference to FIGS. 21 and 22. For simplicity of the present disclosure, only drawing references to FIG. 24 will be included in this section. In a first step S710 of the method, the host computer provides user data. In an optional substep (not shown) the host computer provides the user data by executing a host application. In a second step S712, the host computer initiates a transmission carrying the user data to the UE. The transmission may pass via the base station, in accordance with the teachings of the embodiments described throughout this disclosure. In an optional third step S715, the UE receives the user data carried in the transmission.

Figure 25:
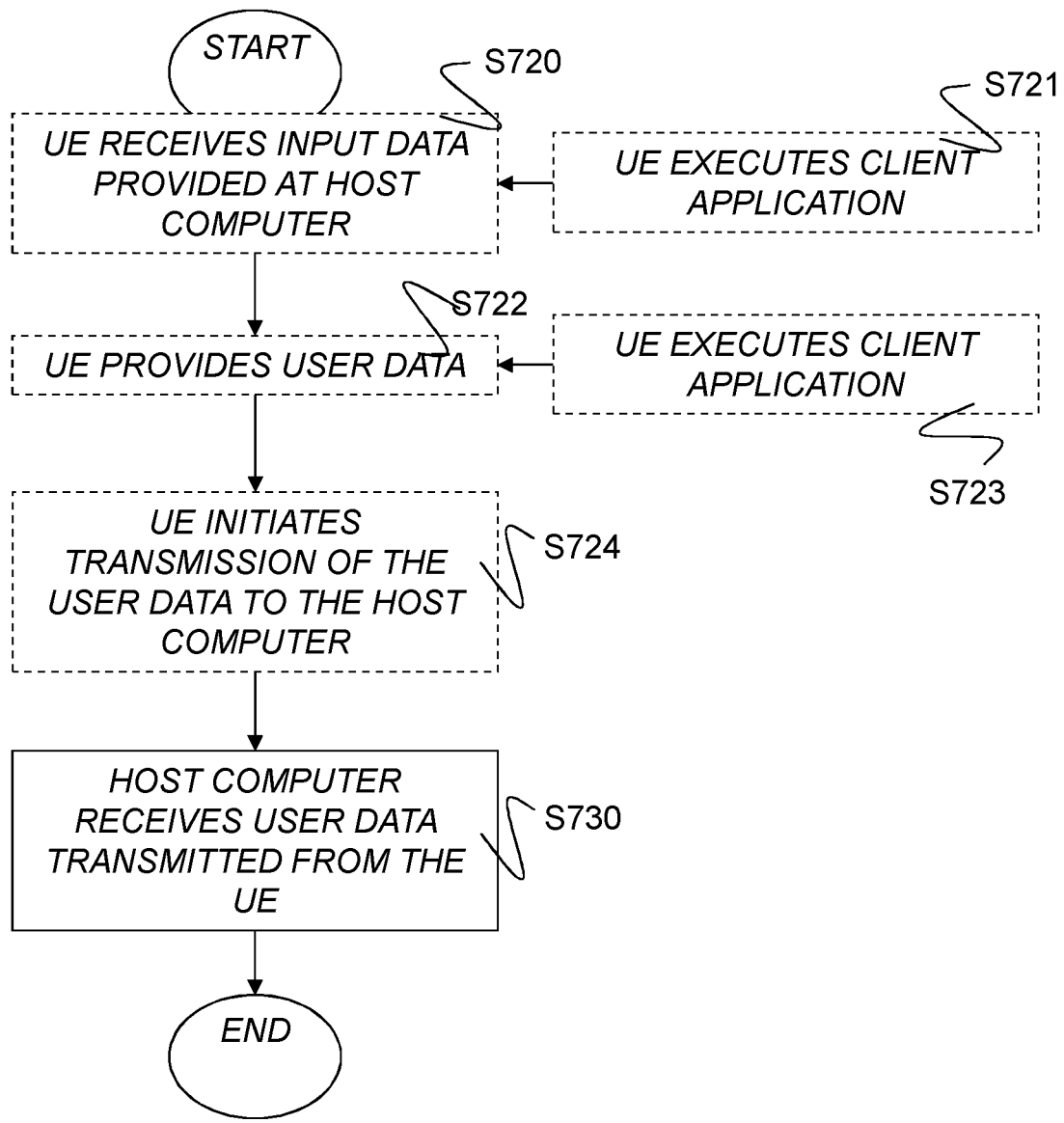

FIG. 25 is a flowchart illustrating a method implemented in a communication system, in accordance with one embodiment. The communication system includes a host computer, a base station and a UE which may be those described with reference to FIGS. 21 and 22. For simplicity of the present disclosure, only drawing references to FIG. 25 will be included in this section. In an optional first step S720 of the method, the UE receives input data provided by the host computer. Additionally or alternatively, in an optional second step S722, the UE provides user data. In an optional substep S723 of the second step S722, the UE provides the user data by executing a client application. In a further optional substep S721 of the first step S720, the UE executes a client application which provides the user data in reaction to the received input data provided by the host computer. In providing the user data, the executed client application may further consider user input received from the user. Regardless of the specific manner in which the user data was provided, the UE initiates, in an optional third substep S724, transmission of the user data to the host computer. In a fourth step S730 of the method, the host computer receives the user data transmitted from the UE, in accordance with the teachings of the embodiments described throughout this disclosure.

Figure 26:
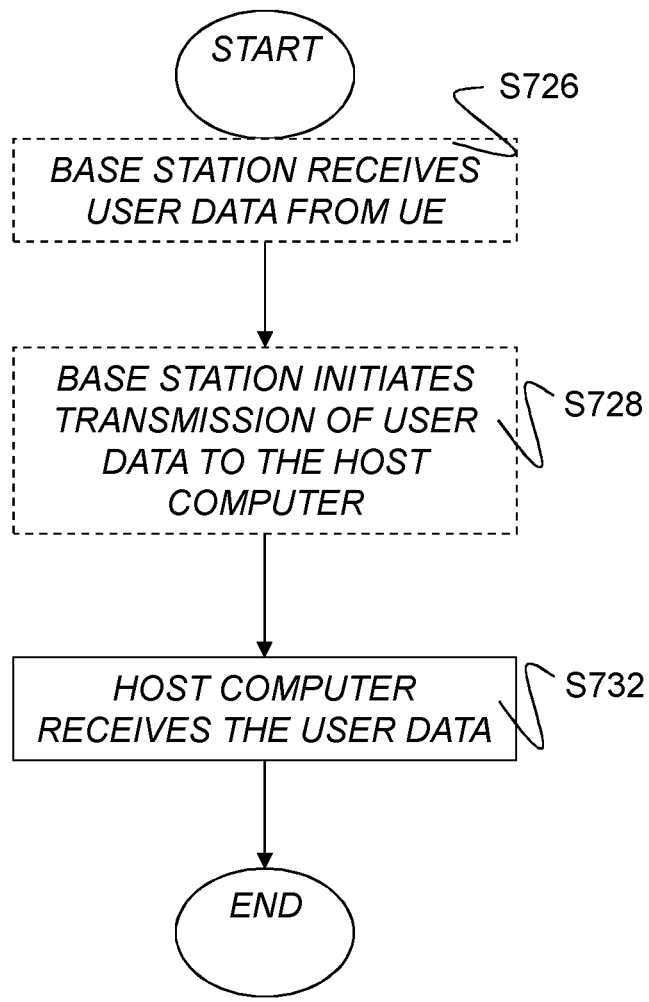

FIG. 26 is a flowchart illustrating a method implemented in a communication system, in accordance with one embodiment. The communication system includes a host computer, a base station and a UE which may be those described with reference to FIGS. 21 and 22. For simplicity of the present disclosure, only drawing references to FIG. 26 will be included in this section. In an optional first step S726 of the method, in accordance with the teachings of the embodiments described throughout this disclosure, the base station receives user data from the UE. In an optional second step S728, the base station initiates transmission of the received user data to the host computer. In a third step S732, the host computer receives the user data carried in the transmission initiated by the base station.

Numbered Embodiments

1. A network node configured to communicate with a wireless device, the network node comprising a radio interface and processing circuitry configured to schedule, in a first radio access system having a first carrier with a first carrier frequency band and a second carrier with a second carrier frequency band, uplink signals in said second carrier.

2. The network node of embodiment 1, wherein the network node is a base station.

3. A communication system including a host computer comprising:
  processing circuitry configured to provide user data; and
  a communication interface configured to forward the user data to a cellular network for transmission to a wireless device,
  wherein the cellular network comprises a network node having a radio interface and processing circuitry, the processing circuitry of the network node being configured to schedule, in a first radio access system having a first carrier with a first carrier frequency band and a second carrier with a second carrier frequency band, uplink signals in said second carrier.

4. The communication system of embodiment 3, further including the network node.

5. The communication system of embodiment 4, further including the wireless device, wherein the wireless device is configured to communicate with the network node.

6. The communication system of embodiment 5, wherein:
  the processing circuitry of the host computer is configured to execute a host application, thereby providing the user data; and
  the wireless device comprises processing circuitry configured to execute a client application associated with the host application.

7. The communication system of any of the embodiments 3 to 6, wherein the wireless device is a user equipment.

8. The communication system of any of the embodiments 3 to 7, wherein the network node is a base station.

9. A method implemented in a network node, comprising scheduling, in a first radio access system having a first carrier with a first carrier frequency band and a second carrier with a second carrier frequency band, uplink signals in said second carrier.

10. A method implemented in a communication system including a host computer, a network node and a wireless device, the method comprising:
  at the host computer, providing user data; and
  at the host computer, initiating a transmission carrying the user data to the wireless device via a cellular network comprising the network node, wherein the network node schedules, in a first radio access system having a first carrier with a first carrier frequency band and a second carrier with a second carrier frequency band, uplink signals in said second carrier.

11. The method of embodiment 10, further comprising:
  at the network node, transmitting the user data.

12. The method of embodiment 11, wherein the user data is provided at the host computer by executing a host application, the method further comprising:
  at the wireless device, executing a client application associated with the host application.

13. The method of any of the embodiments 10 to 12, wherein the wireless device is a user equipment.

14. The method of any of the embodiments 10 to 13, wherein the network node is a base station.

15. A wireless device configured to communicate with a network node, the wireless device comprising a radio interface and processing circuitry configured to receive signals scheduled, in a first radio access system having a first carrier with a first carrier frequency band and a second carrier with a second carrier frequency band, downlink signals in said second carrier.

16. The wireless device of embodiment 15, wherein the wireless device is a user equipment.

17. A communication system including a host computer comprising:
processing circuitry configured to provide user data; and
a communication interface configured to forward user data to a cellular network for transmission to a wireless device,
wherein the wireless device comprises a radio interface and processing circuitry, the processing circuitry of the wireless device being configured to receive signals scheduled, in a first radio access system having a first carrier with a first carrier frequency band and a second carrier with a second carrier frequency band, downlink signals in said second carrier.

18. The communication system of embodiment 17, further including the wireless device.

19. The communication system of embodiment 18, wherein the cellular network further includes a network node configured to communicate with the wireless device.

20. The communication system of embodiment 19, wherein the network node is a base station.

21. The communication system of any of the embodiments 17 to 20, wherein:
the processing circuitry of the host computer is configured to execute a host application, thereby providing the user data; and
the processing circuitry of the wireless device is configured to execute a client application associated with the host application.

22. The communication system of any of the embodiments 17 to 20, wherein the wireless device is a user equipment.

23. A method implemented in a wireless device, comprising receiving of signals scheduled, in a first radio access system having a first carrier with a first carrier frequency band and a second carrier with a second carrier frequency band, downlink signals in said second carrier.

24. A method implemented in a communication system including a host computer, a network node and a wireless device, the method comprising:
at the host computer, providing user data; and
at the host computer, initiating a transmission carrying the user data to the wireless device via a cellular network comprising the network node, wherein the wireless device receives signals scheduled, in a first radio access system having a first carrier with a first carrier frequency band and a second carrier with a second carrier frequency band, downlink signals in said second carrier.

25. The method of embodiment 24, further comprising:
at the wireless device, receiving the user data from the network node.

26. The method of embodiment 24 or 25, wherein the network node is a base station.

27. The method of any of the embodiments 23 to 26, wherein the wireless device is a user equipment.

28. A wireless device configured to communicate with a network node, the wireless device comprising a radio interface and processing circuitry configured to send uplink signals scheduled, in a first radio access system having a first carrier with a first carrier frequency band and a second carrier with a second carrier frequency band, in said second carrier.

29. The wireless device of embodiment 28, wherein the wireless device is a user equipment.

30. The wireless device of embodiment 28 or 29, wherein the network node is a base station.

31. A communication system including a host computer comprising:
a communication interface configured to receive user data originating from a transmission from a wireless device to a network node,
wherein the wireless device comprises a radio interface and processing circuitry, the processing circuitry of the wireless device being configured to send uplink signals scheduled, in a first radio access system having a first carrier with a first carrier frequency band and a second carrier with a second carrier frequency band, in said second carrier.

32. The communication system of embodiment 31, further including the wireless device.

33. The communication system of embodiment 32, further including the network node, wherein the network node comprises a radio interface configured to communicate with the wireless device and a communication interface configured to forward to the host computer the user data carried by a transmission from the wireless device to the network node.

34. The communication system of embodiment 32 or 33, wherein:
the processing circuitry of the host computer is configured to execute a host application; and
the processing circuitry of the wireless device is configured to execute a client application associated with the host application, thereby providing the user data.

35. The communication system of embodiment 32 or 33, wherein:
the processing circuitry of the host computer is configured to execute a host application, thereby providing request data; and
the processing circuitry of the wireless device is configured to execute a client application associated with the host application, thereby providing the user data in response to the request data.

36. The communication system of any of the embodiments 31 to 35, wherein the wireless device is a user equipment.

37. The communication system of any of the embodiments 31 to 35, wherein the network node is a base station.

38. A method implemented in a wireless device, comprising sending uplink signals scheduled, in a first radio access system having a first carrier with a first carrier frequency band and a second carrier with a second carrier frequency band, in said second carrier.

39. The method of embodiment 38, further comprising:
providing user data; and
forwarding the user data to a host computer via the transmission to a network node.

40. A method implemented in a communication system including a host computer, a network node and a wireless device, the method comprising:
at the host computer, receiving user data transmitted to the network node from the wireless device, wherein the wireless device sends uplink signals scheduled, in a first radio access system having a first carrier with a first carrier frequency band and a second carrier with a second carrier frequency band, in said second carrier.

41. The method of embodiment 40, further comprising:
at the wireless device, providing the user data to the network node.

42. The method of embodiment 41, further comprising:
at the wireless device, executing a client application, thereby providing the user data to be transmitted; and at the host computer, executing a host application associated with the client application.

43. The method of embodiment 41, further comprising:
at the wireless device, executing a client application; and
at the wireless device, receiving input data to the client application, the input data being provided at the host computer by executing a host application associated with the client application,
wherein the user data to be transmitted is provided by the client application in response to the input data.

44. The method of any of the embodiments 39 to 43, wherein the network node is a base station.

45. The method of any of the embodiments 38 to 44, wherein the wireless device is a user equipment.

46. A network node configured to communicate with a wireless device, the network node comprising a radio interface and processing circuitry configured to receive uplink signals scheduled, in a first radio access system having a first carrier with a first carrier frequency band and a second carrier with a second carrier frequency band, in said second carrier.

47. The network node of embodiment 46, wherein the network node is a base station.

48. The network node of embodiment 46 or 47, wherein the wireless device is a user equipment.

49. A communication system including a host computer comprising a communication interface configured to receive user data originating from a transmission from a wireless device to a network node, wherein the network node comprises a radio interface and processing circuitry, the processing circuitry of the network node being configured to receive uplink signals scheduled, in a first radio access system having a first carrier with a first carrier frequency band and a second carrier with a second carrier frequency band, in said second carrier.

50. The communication system of embodiment 49, further including the network node.

51. The communication system of embodiment 50, further including the wireless device, wherein the wireless device is configured to communicate with the network node.

52. The communication system of embodiment 51, wherein:
the processing circuitry of the host computer is configured to execute a host application;
the wireless device is configured to execute a client application associated with the host application, thereby providing the user data to be received by the host computer.

53. The communication system of any of the embodiments 49 to 52, wherein the network node is a base station.

54. The communication system of any of the embodiments 49 to 53, wherein the wireless device is a user equipment.

55. A method implemented in a network node, comprising receiving uplink signals scheduled, in a first radio access system having a first carrier with a first carrier frequency band and a second carrier with a second carrier frequency band, in said second carrier.

56. A method implemented in a communication system including a host computer, a network node and a wireless device, the method comprising:
at the host computer, receiving, from the base station, user data originating from a transmission which the network node has received from the wireless device, wherein the wireless device receives uplink signals scheduled, in a first radio access system having a first carrier with a first carrier frequency band and a second carrier with a second carrier frequency band, in said second carrier.

57. The method of embodiment 56, further comprising:
at the network node, receiving the user data from the wireless device.

58. The method of embodiment 57, further comprising:
at the network node, initiating a transmission of the received user data to the host computer.

59. The method of any of the embodiments 55 to 58, wherein the wireless device is a user equipment.

60. The method of any of the embodiments 55 to 59, wherein the network node is a base station.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

ABBREVIATIONS

ACK/NACK Acknowledgement/Non-acknowledgement
ASIC Application Specific Integrated Circuits
BB Base Band
BTS Base Transceiver Stations
CD Compact Disc
CN Core Network
COTS Common Off-The-Shelf
CPE Customer Premises Equipment
CPU Central Processing Units
DSP Digital Signal Processors
DVD Digital Versatile Disc
DL Downlink
eNB evolved Node B
FDD Frequency Division Duplex
FPGA Field Programmable Gate Arrays
gNB New Radio Node B
HARQ Hybrid Automatic Repeat reQuest
HDD Hard Disk Drive
HW Hardware
I/O input/output
LEE Laptop Embedded Equipment
LME Laptop Mounted Equipment
LTE Long-Term Evolution
MAC Medium Access Control
MEM memory units
NB Node B
ND Network Device
NFV Network Function Virtualization
NI Network Interfaces
NIC Network Interface Controller
NR New Radio
OS Operating System
OSS Operations and Support System
PC Personal Computer
PCell Primary Cell
PDA Personal Digital Assistant
PDCCH Physical Downlink Control CHannel
PDSCH Physical Downlink Shared CHannel
PLC Programmable Logic Controllers
PRB Physical Resource Block
PUCCH Physical Uplink Control CHannel
QUIC Quick UDP Internet Connections
QoS Quality of Service RAN Radio Access Network
RAM Random Access Memory
REG Registers
ROM Read-Only Memory
RRU Remote Radio Units
STA Station
SW Software
TCP Transmission Control Protocol
TDD Time Division Duplex
TTI Transmission Time Interval
UDP User Datagram Protocol
UE User Equipment
UL UpLink
USB Universal Serial Bus
VM Virtual Machine
VMM Virtual Machine Monitor
VNE Virtual Network Element
WNIC Wireless Network Interface Controller

The invention claimed is:

1. A method for operating one or more radio access systems, comprising:
configuring a first carrier having a first carrier frequency band and a second carrier having a second carrier frequency band for use for radio access in a first radio access system;
wherein said second carrier is configured for frequency division duplex signaling;
wherein a useful frequency band of said second carrier is defined to, at least partially, overlap in frequency with a useful frequency band of a third carrier having a third carrier frequency band of a second radio access system;
wherein said third carrier has an overlapping coverage area with said second carrier; and
wherein at least a part of said useful frequency band of said second carrier overlaps in frequency with guard bands of said third carrier,
wherein a center frequency of said useful frequency band of said second carrier is offset with respect to a center frequency of said useful frequency band of said third carrier, and
wherein said offset is equal to a width of said guard bands of said third carrier.

2. The method according to claim 1, characterized in that said useful frequency band of said second carrier is wider than said useful frequency band of said third carrier.

3. The method according to claim 1, characterized in that said first radio access system is configured for restricting signal scheduling to physical resource blocks of limited parts of said useful frequency band of said second carrier.

4. The method according to claim 1, characterized in that said first carrier frequency band is situated at higher frequencies than said second carrier frequency band.

5. The method according to claim 1, further comprising a step of initiating transfer of configuration information to schedulers in said first radio access system.

6. A method for signal scheduling, comprising:
scheduling, in a first radio access system having a first carrier with a first carrier frequency band and a second carrier with a second carrier frequency band, uplink signals in said second carrier;
wherein said second carrier is configured for frequency division duplex signaling;
wherein a useful frequency band of said second carrier is defined to, at least partially, overlap in frequency with a useful frequency band of a third carrier having a third carrier frequency band of a second radio access system;
wherein said third carrier has an overlapping coverage area with said second carrier; and
wherein said uplink signals scheduled to said second carrier are scheduled to physical resource blocks of frequencies of said useful frequency band of said second carrier overlapping in frequency with guard bands of said third carrier,
wherein a center frequency of said useful frequency band of said second carrier is offset with respect to a center frequency of said useful frequency band of said third carrier, and
wherein said offset is equal to a width of said guard bands of said third carrier.

7. The method according to claim 6, characterized in that said uplink signals are comprised in uplink control channels.

8. The method according to claim 7, characterized in that said uplink control channels comprise Acknowledgement (ACK)/Negative Acknowledgment (NACK) signaling.

9. The method according to claim 8, characterized in that said uplink control channels comprises ACK/NACK signaling related to a medium access control layer of a transmission on the first carrier.

10. The method according to claim 8, characterized in that said uplink control channels comprises ACK/NACK signaling related to a traffic control protocol of an end-to-end service.

11. The method according to claim 7, characterized in that if said second radio access system is configured to utilize physical uplink control channel overdimensioning, scheduling, in said first radio access system, uplink signals in said second carrier at frequencies of said overdimensioned physical uplink control channel not being used by said second radio access system.

12. The method according to claim 11, characterized in that said frequencies of said overdimensioned physical uplink control channel not being used by said second radio access system are in frequency situated at at least one outer edge of said useful frequency band of said third carrier.

13. The method according to claim 6, further comprising a step of scheduling downlink signals in said second carrier.

14. The method according to claim 13, characterized in that if said second radio access system is configured to utilize limited resource block scheduling for physical downlink shared channels, in said first radio access system, scheduling downlink signals in said second carrier at frequencies and time slots of said useful frequency band of said third carrier not being used by said second radio access system due to said limited resource block scheduling.

15. The method according to claim 14, characterized in that said frequencies of said useful frequency band of said third carrier not being used by said second radio access system due to said limited resource block scheduling are in frequency situated at least one outer edge of said useful frequency band of said third carrier.

16. The method according to claim 14, characterized in that said scheduling downlink signals in said second carrier comprises scheduling of downlink control channels in a time slot different from a first time slot.

17. A network node comprising a memory and a processor configured to operate in one or more radio access systems, a wherein said network node is configured to:
configure a first carrier having a first carrier frequency band and a second carrier having a second carrier frequency band for use for radio access in a first radio access system;
wherein said second carrier is configured for frequency division duplex signaling;

wherein a useful frequency band of said second carrier is defined to, at least partially, overlap in frequency with a useful frequency band of a third carrier having a third carrier frequency band of a second radio access system;

wherein said third carrier has an overlapping coverage area with said second carrier; and wherein at least a part of said useful frequency band of said second carrier overlaps in frequency with guard bands of said third carrier, wherein a center frequency of said useful frequency band of said second carrier is offset with respect to a center frequency of said useful frequency band of said third carrier, and wherein said offset is equal to a width of said guard bands of said third carrier.

18. A network node comprising a memory and a processor configured to perform signal scheduling, wherein said network node is configured to:

schedule, for a first radio access system having a first carrier with a first carrier frequency band and a second carrier with a second carrier frequency band, uplink signals in said second carrier;

wherein said second carrier is configured for frequency division duplex signaling;

wherein a useful frequency band of said second carrier is defined to, at least partially, overlap in frequency with a useful frequency band of a third carrier having a third carrier frequency band of a second radio access system;

wherein said third carrier has an overlapping coverage area with said second carrier; and wherein said uplink signals scheduled to said second carrier are scheduled to physical resource blocks of frequencies of said useful frequency band of said second carrier overlapping in frequency with guard bands of said third carrier, wherein a center frequency of said useful frequency band of said second carrier is offset with respect to a center frequency of said useful frequency band of said third carrier, and wherein said offset is equal to a width of said guard bands of said third carrier.

* * * * *